US008787464B1

(12) United States Patent
Chaurasia et al.

(10) Patent No.: US 8,787,464 B1
(45) Date of Patent: Jul. 22, 2014

(54) HADAMARD TRANSFORMATION OF DATA FOR VIDEO COMPRESSION

(75) Inventors: Pankaj Chaurasia, Sunnyvale, CA (US); Shankar Moni, Bangalore (IN)

(73) Assignee: Nvidia Corporation, Santa Clara, CA (US)

( * ) Notice: Subject to any disclaimer, the term of this patent is extended or adjusted under 35 U.S.C. 154(b) by 1370 days.

(21) Appl. No.: 11/657,927

(22) Filed: Jan. 24, 2007

Related U.S. Application Data

(60) Provisional application No. 60/772,269, filed on Feb. 10, 2006, provisional application No. 60/772,230, filed on Feb. 10, 2006, provisional application No. 60/772,510, filed on Feb. 10, 2006, provisional application No. 60/772,433, filed on Feb. 10, 2006.

(51) Int. Cl.
*H03M 7/30* (2006.01)

(52) U.S. Cl.
USPC ........... 375/240.18; 375/240; 375/240.01; 375/240.2; 382/232; 382/248; 382/250; 382/276; 382/281

(58) Field of Classification Search
USPC ........... 382/232–250, 276–281; 375/240–254
See application file for complete search history.

(56) References Cited

U.S. PATENT DOCUMENTS

| 5,585,931 | A | 12/1996 | Juri et al. |
| 5,754,457 | A | 5/1998 | Eitan et al. |
| 5,818,529 | A | 10/1998 | Asamura et al. |
| 5,969,750 | A * | 10/1999 | Hsieh et al. ................ 348/14.1 |
| 5,990,812 | A | 11/1999 | Bkhmutsky |
| 6,038,580 | A * | 3/2000 | Yeh ................................ 708/402 |
| 6,507,614 | B1 | 1/2003 | Li |
| 6,738,522 | B1 | 5/2004 | Hsu et al. |
| 6,754,687 | B1 | 6/2004 | Kurak, Jr. et al. |
| 7,439,883 | B1 | 10/2008 | Moni et al. |
| 2002/0135683 | A1 | 9/2002 | Tamama et al. |
| 2002/0143835 | A1 * | 10/2002 | Kechriotis ................... 708/410 |
| 2003/0067977 | A1 | 4/2003 | Chu et al. |
| 2003/0120691 | A1 * | 6/2003 | Nakayama ................... 708/400 |
| 2003/0142105 | A1 | 7/2003 | Lavelle et al. |
| 2003/0191788 | A1 | 10/2003 | Auyeung et al. |
| 2003/0221089 | A1 * | 11/2003 | Spracklen ................... 712/221 |
| 2004/0006581 | A1 * | 1/2004 | Nakayama ................... 708/400 |
| 2006/0177142 | A1 | 8/2006 | Zhou |
| 2006/0227874 | A1 * | 10/2006 | Tongle et al. ............. 375/240.18 |
| 2007/0036225 | A1 * | 2/2007 | Srinivasan et al. ....... 375/240.18 |

OTHER PUBLICATIONS

Row-Column Decomposition Based 2D Transform Optimization on Subword Parallel Processors by Sihvo et al; Publisher: IEEE; Year: 2005.*

Manohar et al., "Progressive Vector Quantization of Multispectral Image Data Using a Massively Parallel SIMD Machine", IEEE, 1992.

(Continued)

*Primary Examiner* — Madhuri Herzog

(57) ABSTRACT

A video processor is described, which is useful for implementing a Hadamard transform process, in compliance with the H.264 standard. The video processor includes an input, for receiving a block of image data. The image data is loaded into an internal register. In response to receiving a SIMD instruction, a multiplier, which incorporates the H.264 Hadamard transform matrix in its associated hardware, processes the block of image data, and writes the resulting partially transformed pixel data back to the internal register, transposing the data during the process.

20 Claims, 20 Drawing Sheets

Flowchart 500

(56) References Cited

OTHER PUBLICATIONS

Gentile et al., "Real-Time Vector Quantization-Based Image Compression on the SIMPil Low Memory SIMD Architecture", IEEE, 1997.

Chaurasia et al.; U.S. Appl. No. 11/657,184; "Forward and Inverse Quantization of Data for Video Compression", filed Jan. 23, 2007.

Chaurasia et al.; U.S. Appl. No. 11/657,928; "Forward and Inverse Transformation of Data for Video Compression", filed Jan. 24, 2007.

* cited by examiner

Flowchart 300

Flowchart 400

Flowchart 500

510

$$\begin{matrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{matrix} \quad \underline{501} \quad \times \quad \begin{matrix} 1 & 1 & 1 & 1 \\ 2 & 1 & -1 & -2 \\ 1 & -1 & -1 & 1 \\ 1 & -2 & 2 & 1 \end{matrix} \quad \underline{599} \quad = \quad \begin{matrix} i_{00} & i_{01} & i_{02} & i_{03} \\ i_{10} & i_{11} & i_{12} & i_{13} \\ i_{20} & i_{21} & i_{22} & i_{23} \\ i_{30} & i_{31} & i_{32} & i_{33} \end{matrix} \quad \underline{511}$$

520

$$\begin{matrix} i_{00} & i_{01} & i_{02} & i_{03} \\ i_{10} & i_{11} & i_{12} & i_{13} \\ i_{20} & i_{21} & i_{22} & i_{23} \\ i_{30} & i_{31} & i_{32} & i_{33} \end{matrix} \quad \underline{511} \quad \rightarrow \quad \begin{matrix} i_{00} & i_{10} & i_{20} & i_{30} \\ i_{01} & i_{11} & i_{21} & i_{31} \\ i_{02} & i_{12} & i_{22} & i_{32} \\ i_{03} & i_{13} & i_{23} & i_{33} \end{matrix} \quad \underline{521}$$

530

$$\begin{matrix} i_{00} & i_{10} & i_{20} & i_{30} \\ i_{01} & i_{11} & i_{21} & i_{31} \\ i_{02} & i_{12} & i_{22} & i_{32} \\ i_{03} & i_{13} & i_{23} & i_{33} \end{matrix} \quad \underline{521} \quad \times \quad \begin{matrix} 1 & 1 & 1 & 1 \\ 2 & 1 & -1 & -2 \\ 1 & -1 & -1 & 1 \\ 1 & -2 & 2 & 1 \end{matrix} \quad \underline{599} \quad = \quad \begin{matrix} X_{00} & X_{10} & X_{20} & X_{30} \\ X_{01} & X_{11} & X_{21} & X_{31} \\ X_{02} & X_{12} & X_{22} & X_{32} \\ X_{03} & X_{13} & X_{23} & X_{33} \end{matrix} \quad \underline{531}$$

540

$$\begin{matrix} X_{00} & X_{10} & X_{20} & X_{30} \\ X_{01} & X_{11} & X_{21} & X_{31} \\ X_{02} & X_{12} & X_{22} & X_{32} \\ X_{03} & X_{13} & X_{23} & X_{33} \end{matrix} \quad \underline{531} \quad \rightarrow \quad \begin{matrix} X_{00} & X_{10} & X_{20} & X_{30} \\ X_{01} & X_{11} & X_{21} & X_{31} \\ X_{02} & X_{12} & X_{22} & X_{32} \\ X_{03} & X_{13} & X_{23} & X_{33} \end{matrix} \quad \underline{541}$$

Figure 5b

Flowchart 700

Assembling a DC Block

| XR | 1324 | | | | | 1313 | 1328 | | 1327 | 1322 | 1326 | | | 1325 | 1321 |
|---|---|---|---|---|---|---|---|---|---|---|---|---|---|---|---|
| Init | $d_{33}$ | $d_{32}$ | $d_{31}$ | $d_{30}$ | $d_{23}$ | $d_{22}$ | $dx_{21}$ | $d_{20}$ | $d_{13}$ | $d_{12}$ | $d_{11}$ | $d_{10}$ | $d_{03}$ | $d_{02}$ | $d_{01}$ | $d_{00}$ |
| Trans | $i_{33}$ | $i_{23}$ | $i_{13}$ | $i_{03}$ | $i_{32}$ | $i_{22}$ | $i_{12}$ | $i_{02}$ | $i_{31}$ | $i_{21}$ | $i_{11}$ | $i_{01}$ | $i_{30}$ | $i_{20}$ | $i_{10}$ | $i_{00}$ |
| Final | $H_{33}$ | $H_{32}$ | $H_{31}$ | $H_{30}$ | $H_{23}$ | $H_{22}$ | $H_{21}$ | $H_{20}$ | $H_{13}$ | $H_{12}$ | $H_{11}$ | $H_{10}$ | $H_{03}$ | $H_{02}$ | $H_{01}$ | $H_{00}$ |

Flowchart 1400

Flowchart 1600

HADAMARD TRANSFORMATION OF DATA FOR VIDEO COMPRESSION

This application claims the benefit under 35 U.S.C. §119(e) of U.S. Provisional Application Ser. No. 60/772,269, filed on Feb. 10, 2006, to Chaurasia et al., entitled "FORWARD AND INVERSE TRANSFORMATION OF DATA FOR VIDEO COMPRESSION" which is incorporated herein in its entirety.

This application claims the benefit under 35 U.S.C. §119(e) of U.S. Provisional Application Ser. No. 60/772,230, filed on Feb. 10, 2006, to Chaurasia et al., entitled "HADAMARD TRANSFORMATION OF DATA FOR VIDEO COMPRESSION" which is incorporated herein in its entirety.

This application claims the benefit under 35 U.S.C. §119(e) of U.S. Provisional Application Ser. No. 60/772,510, filed on Feb. 10, 2006, to Chaurasia et al., entitled "FORWARD AND INVERSE QUANTIZATION OF DATA FOR VIDEO COMPRESSION" which is incorporated herein in its entirety.

This application claims the benefit under 35 U.S.C. §119(e) of U.S. Provisional Application Ser. No. 60/772,433, filed on Feb. 10, 2006, to Moni et al., entitled "BITSTREAM GENERATION FOR VLC ENCODED DATA" which is incorporated herein in its entirety.

BACKGROUND

1. Field of the Invention

The field of the present invention pertains to digital video. More particularly, the present invention relates to compression and decompression of digital encoded video data.

2. Related Art

For more than a decade, unified video encoding standards have been utilized both to allow easier, universal access to digital video data and also to allow ever-increasing fidelity to combine with ever-decreasing space requirements. Standards such as MPEG-2, the standard used for current DVD video, have been widely adopted and implemented by people throughout the world.

With the advent of the Internet age, and the adoption of many portable electronic media devices (mobile phones, portable media players, laptops, and the like), a new digital video standard was highly desirable. The new standard needed to have better video compression efficiency than previous standards, without introducing so much complexity into the standard that implementation would not be cost-effective. A combination of standards groups coordinated on this project. The result is the H.264, or Advanced Video Coding (AVC), standard.

The H.264 standard, so-called because of its ITU document number, offers numerous advantages over its predecessors. For example, the H.264 standard can achieve nearly double the compression efficiency of the older MPEG-2 standard, while offering, in some cases, dramatic improvements to picture quality and fidelity. Additionally, while considerably more complex to implement than its predecessors, improvements in technology make implementing the H.264 standard possible.

The H.264 standard has a wide variety of planned and potential applications. It has already been accepted as the standard for high-definition television in many parts of the world. A modified form of the standard, incorporating some extensions notice the Fidelity Range Extensions, is part of the defined standard for both HD and blue ray DVDs. It has applications for video telephony, many types of streaming video data, portable devices, and numerous Internet video applications.

Because of the format the standard takes, nearly every implementation will perform certain tasks. What sets various implementations apart from others is how these subtasks involved in an encoding and decoding video data are implemented.

Two common approaches to the implementation of the AVC standard have been utilized. First, the standard can be implemented fully in software. There are advantages to using software for this task. For example, a software implementation does not require any special purpose hardware; a general-purpose CPU can be utilized instead. Further, software implementations can be constructed so as to be more dynamic, such that they can be altered to fit a variety of circumstances. However, as will be discussed in greater detail below, software implementations that rely upon general-purpose CPUs are extremely inefficient.

The second common approach is to completely implement the standard as a specific piece of hardware. Specific purpose hardware is faster than a software implementation, but tends to be less dynamic.

SUMMARY

What would be useful would be to have an implementation that had the speed of special-purpose hardware, and also some of the agility that can be associated with software implementations.

A video processor is described, which is useful for implementing a Hadamard transform process, in compliance with the H.264 standard. The video processor includes an input, for receiving a block of image data. The image data is loaded into an internal register. In response to receiving a SIMD instruction, a multiplier, which incorporates the H.264 Hadamard transform matrix in its associated hardware, processes the block of image data, and writes the resulting partially transformed pixel data back to the internal register, transposing the data during the process.

In another embodiment, a method of performing a Hadamard transform operation is described. The method entails loading pixel data corresponding to a block of image data into a single register. After receiving a Hadamard transform SIMD instruction, the pixel data is processed in a hardware processor. The processing involves multiplying the pixel data by a Hadamard transform matrix, implemented in hardware, e.g., as a plurality of bit shifters, adders, and sign changing components, and writing the result back to the internal register, transposing the partially transformed data in the process. Some embodiments of the method also include, after receiving a second Hadamard transform SIMD instruction, processing the transposed partially transformed data via the same hardware, and writing the result back to the internal register, transposed, resulting in Hadamard transformed data.

In another embodiment, a computing system is described. The computing system incorporates a bus, a processor, a memory, and a video processor. The video processor includes an input for receiving a block of image data, an internal register for storing the block of image data, and a multiplier. The multiplier includes a hardware implementation of a Hadamard transform matrix, and is configured to receive Single Instruction Multiple Data (SIMD) instructions from a software control structure. Upon receiving a Hadamard transform SIMD instruction, the multiplier performs a 1-D transform of the block of image data, producing partially transformed data, and writes the partially transformed data to the internal register in a transposed manner. The multiplier then performs a 1-D transform of the partially transformed data, producing Hadamard transformed data. Some embodiments also incorporate a camera and digital data storage, which allows the computing system to capture digital video data.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5b depicts the forward transformation of pixel data in the prior art implementation.

DETAILED DESCRIPTION

Figure 1:
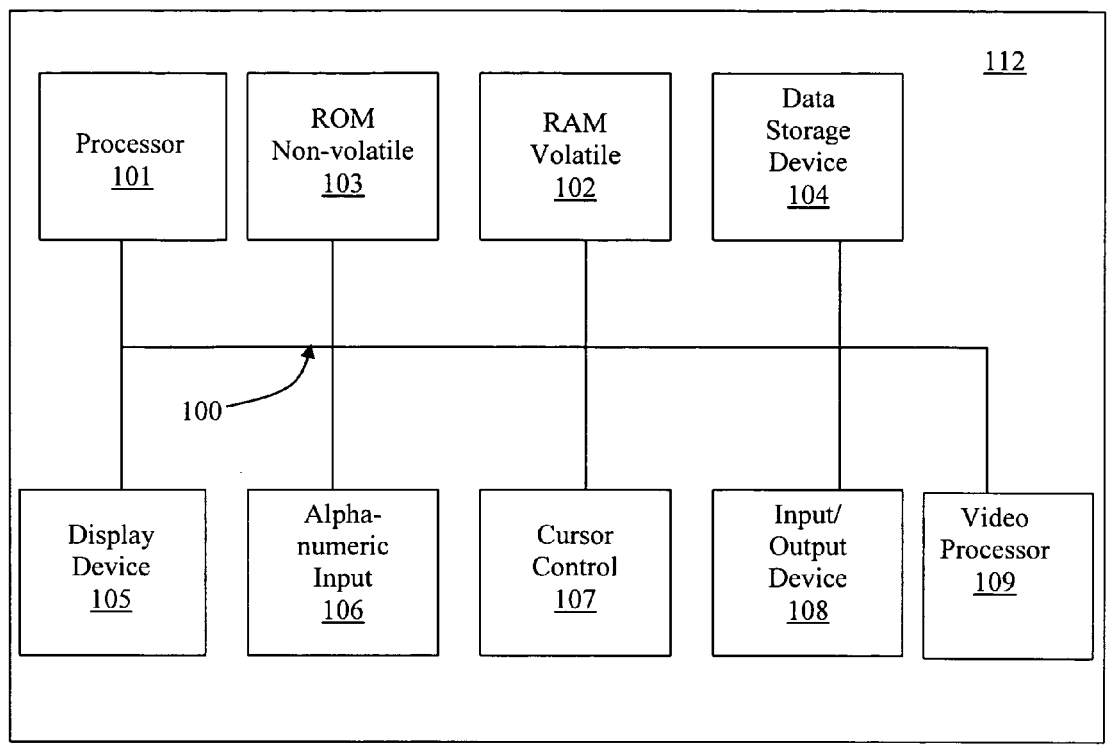
FIG. 1 depicts an exemplary computer system, upon which embodiments of the present invention may be practiced.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 8) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Referring now to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1. In several embodiments, for example, a media server or a personal video recorder (PVR) is utilized, in place of system 112. In another embodiment, system 112 is connected to a network attached storage device (NAT). Moreover, the present invention may be practiced on any system which can be configured to allow it, not just computer systems like computer system 112.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., hard disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network). Also included in computer system 112 is video processor 109. In some embodiments, video processor 109 is incorporated into central processor 101. In other embodiments, video processor 109 is a separate, discrete component. In other embodiments, video processor 109 is incorporated into another component. In other embodiments, video processor 109 is included in system 112 in other ways.

It is understood that embodiments of the present invention can be practiced on many different types of computer system 112. Examples include, but are not limited to, desktop computers, workstations, servers, media servers, laptops, gaming consoles, and personal digital assistants (PDAs), as well as other electronic devices with computing and data storage capabilities, such as wireless telephones, media center computer, digital video recorders, digital cameras, and digital audio playback or recording devices.

Video Compression

Figure 2:
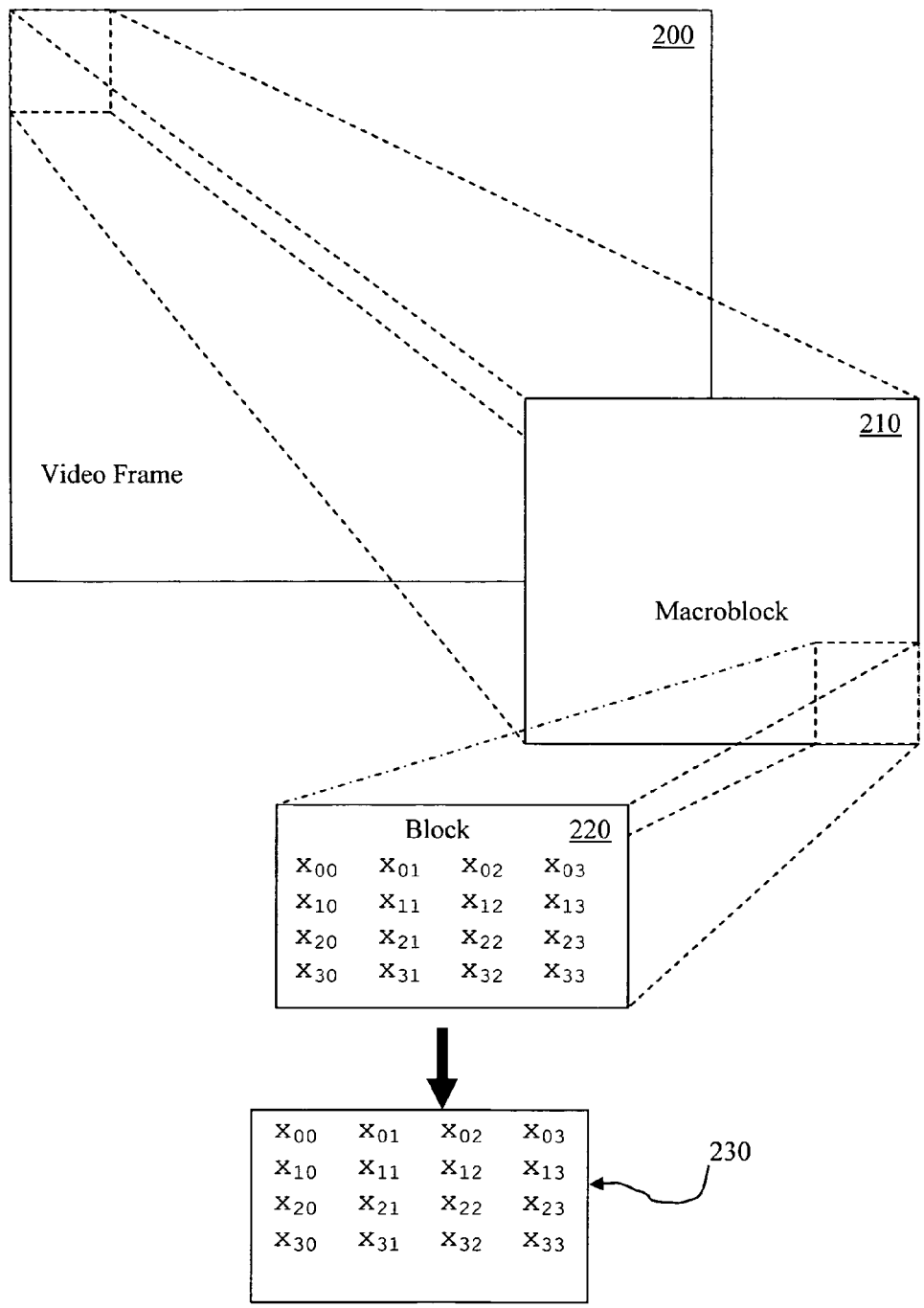
FIG. 2 depicts the relationship between a frame, a macroblock, and a block of pixel data.

With reference now to FIG. 2, a single image or frame of digital video data is shown. Image 200 is depicted as being a square image, 160 pixels by 160 pixels. Rather than processing all 25,600 pixels at once, the H.264 standard calls for subdividing image 200 into a number of macroblocks, such as macroblock 210. The standard defines a macroblock as being 16 pixels by 16 pixels; some of the extensions to the standard allow for macroblocks of differing sizes. In the embodiments discussed herein, the 16 pixel by 16 pixel macroblock will be used for exemplary purposes. It is understood that the present invention can be extended to cover macroblocks of different sizes.

For some operations during the encoding or decoding process defined by the H.264 standard, operations are performed on a macroblock, such as macroblock 210. For other operations however, the 256 pixels of macroblock 210 are still inefficiently large. Macroblock 210 therefore is subdivided into a number of blocks, such as block 220. Block 220 is shown here as being four pixels by four pixels, or a total of 16 pixels. Extensions to the standard also allow for differing block sizes, e.g., eight pixels by eight pixels. In the embodiments discussed herein, the four pixel by four pixel block will be used for exemplary purposes. It is understood that the present invention can be extended to cover blocks of differing sizes.

The H.264 standard defines a pixel, such as the pixels depicted in block 220, as being an eight bit representation. Some of the extensions to the H.264 standard allow for pixels of greater length, e.g., 10 bits. The 8-bit pixel will be used throughout this discussion for exemplary purposes. It is understood that the present invention can be extended to cover pixels of differing bit lengths.

As a shown in FIG. 2, it is common to represent the pixels of a block, such as block 220, as a mathematical matrix, such as matrix 230. This representation is convenient, as a number of the operations performed in conjunction with the H.264 standard are most easily handled as matrix multiplication operations. Given an 8-bit length for pixel, the values in matrix 230 can range from zero to 255. For purposes of identification, matrix 230 will be referenced as [x], a matrix with 16 discrete values, arranged in four rows and four columns.

Figure 3:
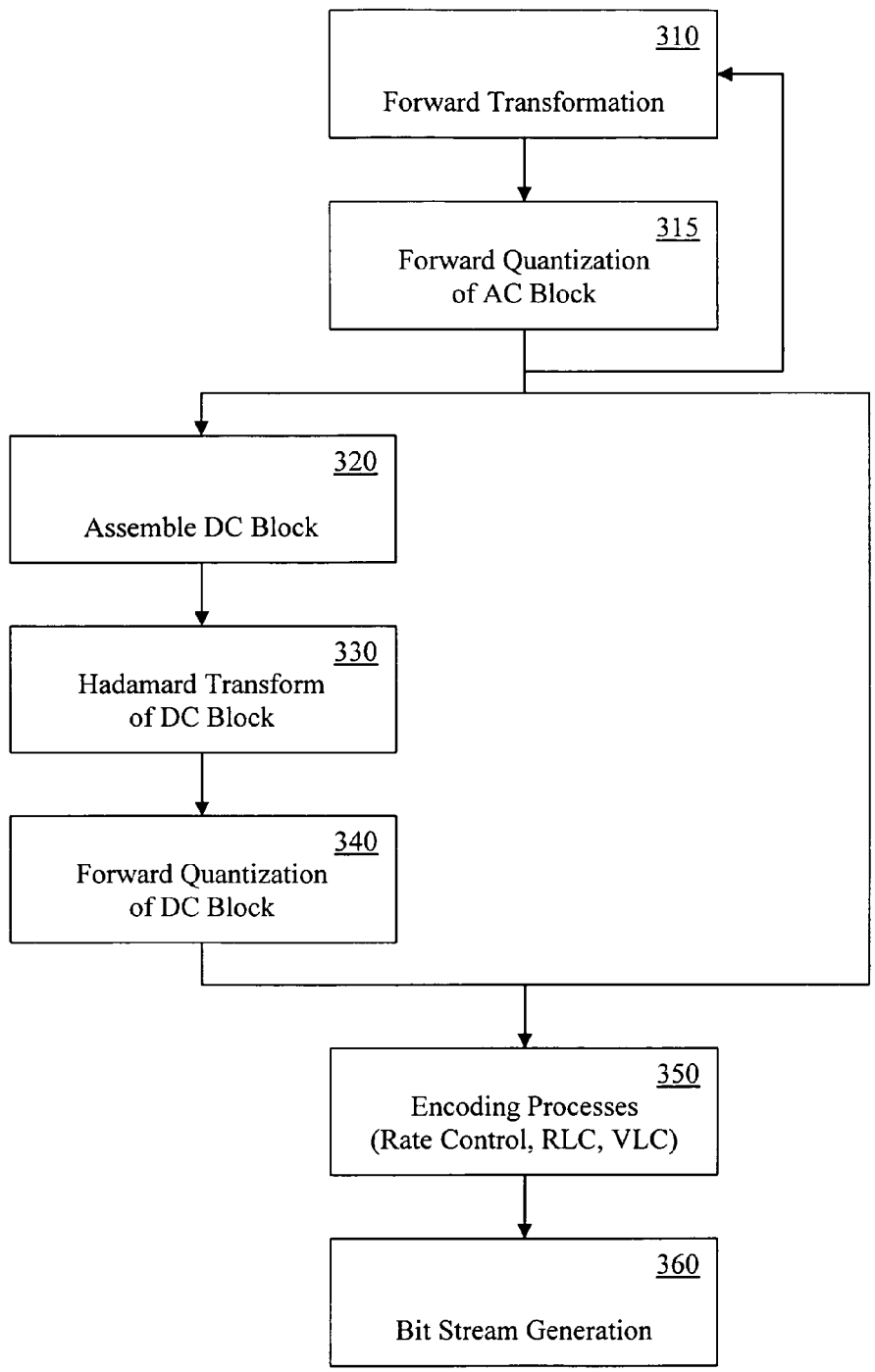
FIG. 3 depicts a flowchart of steps performed during the encoding of a compression digital video.

With reference to FIG. 3, a flowchart showing some of the steps performed during the application of the H.264 standard are depicted, in accordance with one embodiment of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

In the depicted embodiment, in step 310, an image or a frame from a digital video is passed to a forward transform process. As is described in greater detail below, the forward transform process is handled one block at the time, until an entire megablock has been processed. In step 315, the 16 AC blocks, from which the DC values have been removed, are each passed through a forward quantization process. In step 320, after all 16 blocks of the megablock have passed through the forward transform process, the DC values of each block are combined into a DC block. In step 330, this DC block may undergo a Hadamard transform process. In step 340, the Hadamard transformed DC block then goes through a forward quantization process. In step 350, both the quantized DC and AC blocks undergo a number of additional compression and encoding routines, as specified by the H.264 standard, which may include rate control, run length coding (RLC), and variable length coding (VLC). In step 360, the now-encoded video data is placed into a bit stream. In some embodiments, under certain conditions, some steps may be omitted, e.g., the DC block transformations of steps 330 and 340.

As was previously noted, is understood that different embodiments of the present invention may use differing approaches to the tasks and process outlined in flowchart 300. For example, in one embodiment, each block in macroblock passes first through a forward transform process, has the DC value removed, and is passed through a forward quantization process, before a second block undergoes the same treatment.

Further, the H.264 standard specifies under what conditions a Hadamard transformation of the DC block needs to occur. Also, what additional encoding and compression techniques will be applied in step 350 will vary, according to the H.264 standard and the intended application.

Forward and Reverse Transform

In many video compression standards, some sort of mathematical transformation process is used in order to allow compression techniques to be applied while retaining an acceptable amount of image fidelity. In many older standards, a discrete cosine transform, or DCT, was utilized. For the H.264 standard, a simpler transform operation was specified, making for easier implementation while retaining most of the advantages of DCT. As will become apparent below, the forward transform operation of the H.264 standard lends itself to the implementation of the present invention.

Figure 4:
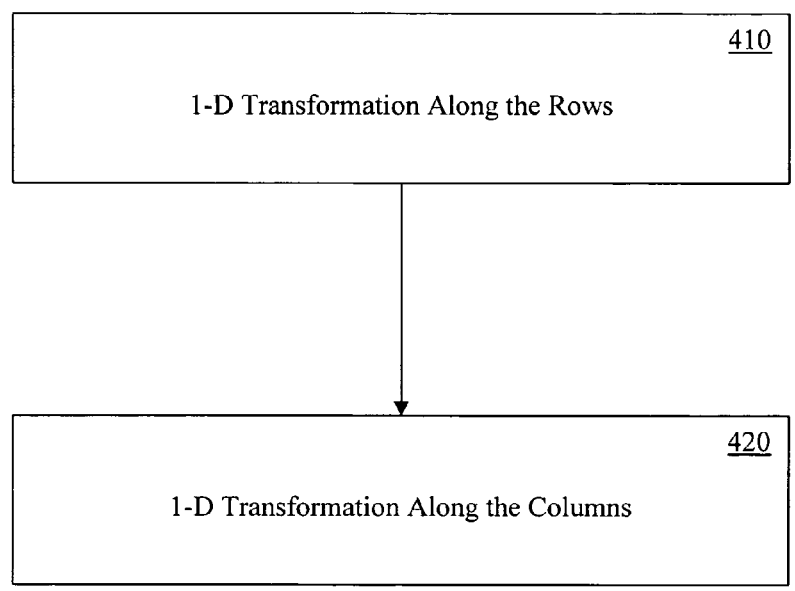
FIG. 4 depicts a flowchart of steps performed during the forward transformation of pixel data.

With reference now FIG. 4, a flowchart showing the forward transform process is depicted, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

In step 410, a 1-D transformation along the rows is performed. For example, given matrix [x], as shown in FIG. 2, matrix [x] is multiplied by the forward transform matrix defined by the H.264 standard, as shown below in Table 1. (Exemplary matrix multiplication is illustrated below, with reference to FIG. 8.) The result is a new 4×4 matrix, which has been partially transformed.

TABLE 1

Forward Transformation Matrix

| 1 | 1  | 1  | 1  |
|---|----|----|----|
| 2 | 1  | -1 | -2 |
| 1 | -1 | -1 | 1  |
| 1 | -2 | 2  | 1  |

In step 420, a 1-D transformation along the columns is performed. The partially transformed matrix that resulted from step 410 is now multiplied by the forward transform matrix, shown in Table 1 above. The result of the step is a fully transformed 4×4 matrix, which can be referred to as [X].

Figure 5A:
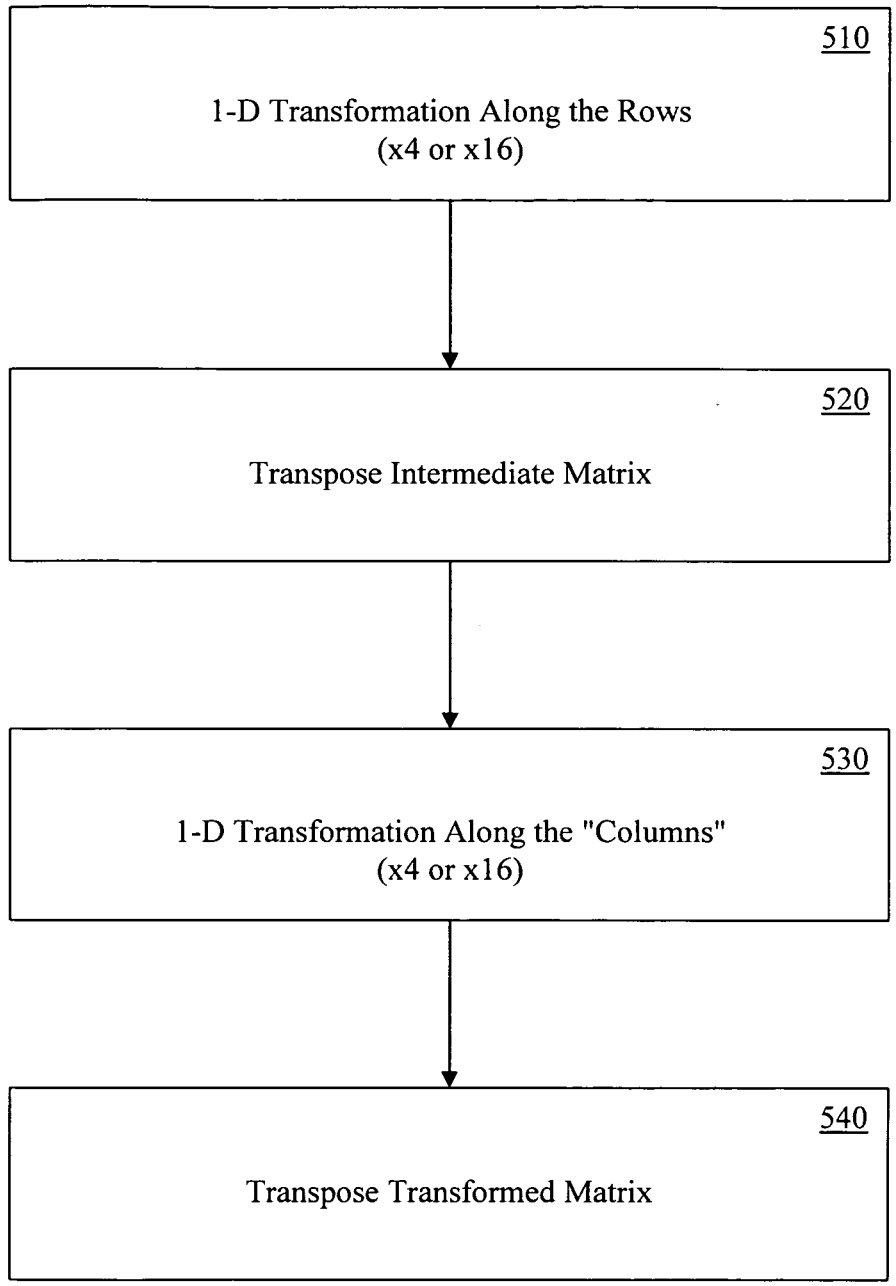
FIG. 5a depicts a prior art implementation of a software process for forward transformation.

With reference now to FIG. 5a, a flowchart showing a prior art implementation of the forward transform is depicted. The implementation depicted in FIG. 5a is a typical software implementation of the forward transform defined by the H.264 standard. With reference now to FIG. 5b, an illustration of the implementation of FIG. 5a is provided.

With reference now to step 510, a 1-D transformation along the rows is performed. A block, represented as matrix 501, is multiplied by the forward transformation matrix 599 as shown. The result is intermediate matrix 511. In a general-purpose processor, this 1-D transformation involves at least 16 discrete multiplications. In a processor supporting a SIMD instruction for 1-D transformation, step 510 involves four iterations. As such, depending on the architecture, a software implementation such as that described in FIG. 5a will require at least four to 16 processor cycles in order to perform this 1-D transformation.

With reference now to step 520, the intermediate matrix 511 must be transposed. Because the H.264 standard requires a 2-D transform of the original matrix [x], first along the rows and then along the columns, and because of how matrix multiplication works, it is necessary to transpose the intermediate matrix, such that the columns and the rows are reversed. As shown in FIG. 5b, intermediate matrix 511 becomes transposed intermediate matrix 521. In a typical software implementation, this transposition requires a minimum of 16 to 20 cycles.

With reference now to step 530, a 1-D transformation along the rows of transposed intermediate matrix 521 is performed. The result is transposed transformed matrix 531. As with the transformation performed in step 510, the software implementation requires at least four to 16 processor cycles.

With reference now to step 540, the transposed transformed matrix 531 must be transposed. In order to reach the desired outcome, the transposition of step 520 must now be reversed. Transposed transformed matrix 531 becomes transformed matrix 541. This transposition requires a minimum of 16 to 20 cycles.

The end product of the implementation depicted in FIG. 5a is the transformed matrix required by the H.264 standard. To reach this end goal, a minimum of 40 processor cycles is required. On non-SIMD machines, an optimistic estimate would be approximately 112 cycles.

Figure 6:
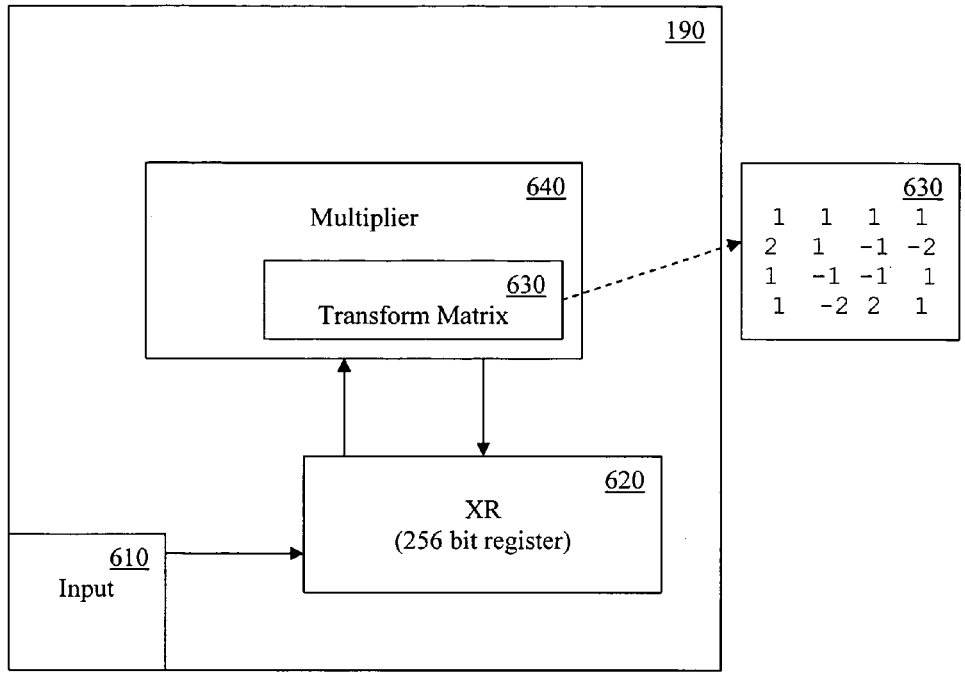
FIG. 6 depicts a video processor, in accordance with one embodiment of the present invention.

With reference now to FIG. 6, a video processor 190 is depicted, in accordance with one embodiment of the present invention. Video processor 190 in this embodiment is configured to implement the forward transformation process associated with the H.264 standard. Although video processor 190 is shown as including a number of discrete components, it is understood that in other embodiments, different components might be utilized, components might be combined, or components might be separated.

Video processor 190 includes an input 610, through which video data can be received. In some embodiments, video processor 190 also receives SIMD instructions from controlling software through input 610. In other embodiments, video processor 190 receives instructions from an alternative input (not shown).

Video processor 190 includes a register 620. In this embodiment, register 620 a shown as a SIMD vector, capable of holding 16 elements. In other embodiments, the length of register 620 may vary. In some embodiments, two shorter registers 620 are utilized in place of one longer register.

Video processor 190 is depicted as incorporating transformation matrix 630. In the preferred embodiments, transformation matrix 630 is hardwired into video processor 190, thus obviating the need to preload the transformation matrix values into video processor 190. In other embodiments, transformation matrix 630 is implemented as a register, similar to register 620, and loaded with the values associated with the transformation matrix.

Video processor 190 includes multiplier 640. In this embodiment, multiplier 640 multiplies the value stored in register 620 by the transformation matrix 630, and writes back to register 620. This is discussed in greater detail below. The hardware that underlies multiplier 640 is discussed with reference to FIG. 9.

Figure 7:
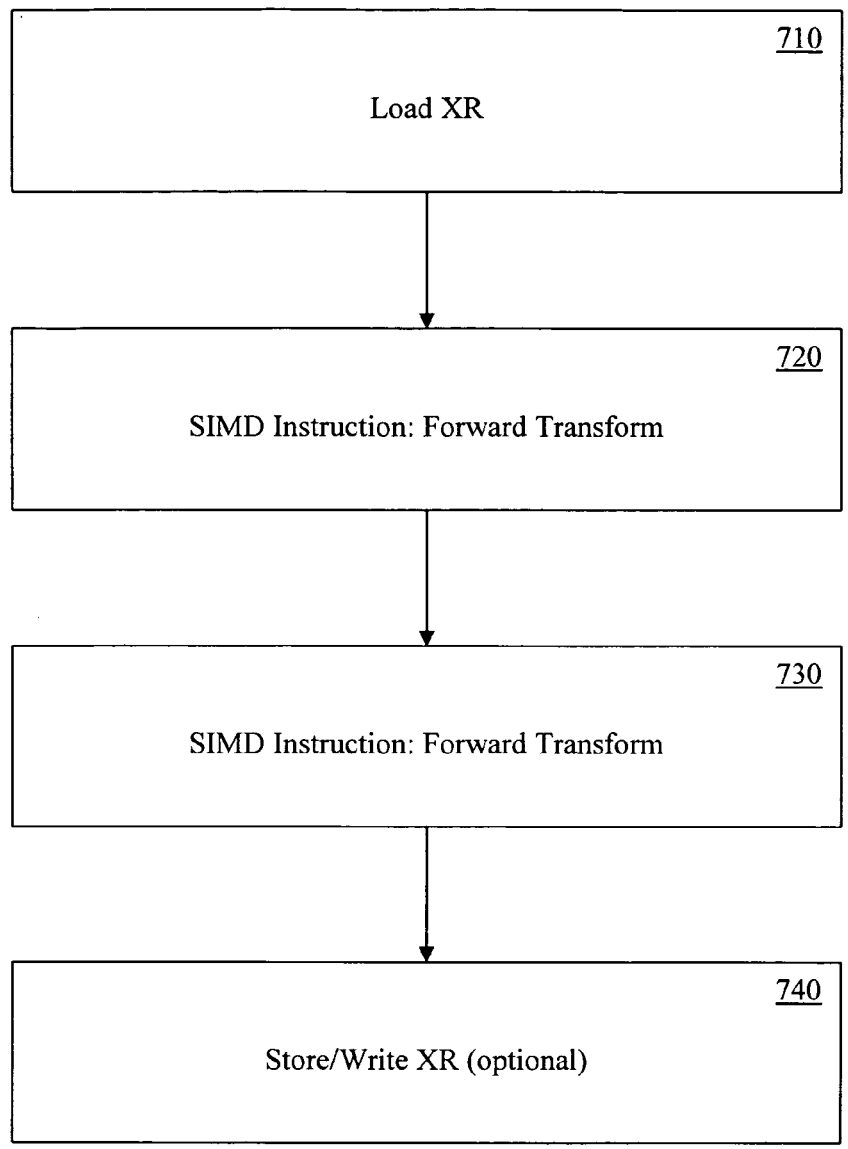
FIG. 7 depicts a flowchart of steps performed during a forward transformation of pixel data, in accordance with one embodiment of the present invention.

With reference now to FIG. 7, a flowchart of a method of performing a forward transformation is depicted, in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference now to step 710 and FIG. 6, a block of pixel data is loaded into a register, register XR. In one embodiment, XR, or register 620, is a 16 element SIMD vector. When dealing with 8-bit pixel values, it is convenient for each element of XR to support 16 bits; in such embodiments, therefore, XR is a 256 bit register. In other embodiments, different size registers may be used, or several registers may be used in order to store the block of pixel data.

Pixel data enters video processor 190 via input 610, e.g., a connection to a system bus.

The block of pixel data, [x], is stored as shown in FIG. 6. For example, value $x_{00}$ is stored in element 621, value $x_{01}$ is stored in element 625, and value $x_{10}$ is stored in element 626. Other arrangements of pixel data are equally valid, though it is preferable that they be consistent.

In step 720, the video processor acts upon a SIMD instruction to perform a forward transformation. In one embodiment, this instruction is issued by controlling software. Upon receiving this instruction, video processor 190 performs a 1-D transformation of the pixel data stored in XR. Multiplier 640 multiplies the data in XR by the transformation matrix 630. The intermediate matrix that results from this 1-D transformation is then written back to register XR. When the intermediate matrix is written back to XR however, it is written back in a transposed form. This is depicted in FIG. 6, such that where block 625 used to be $x_{01}$, it is now $i_{10}$, and where block 626 was once $x_{10}$, it is now $i_{01}$.

By performing this transposition during the writeback of the intermediate matrix, the present embodiment gains a significant performance advantage over prior art software implementations. Specifically, where the software implementation required four to 16 cycles to perform the multiplication of the matrices, and a further 16 to 20 cycles to perform the transposition, embodiments of the present invention can perform both steps in just one to two cycles, depending on bus widths and processor speed.

In step 730, the video processor acts upon a second SIMD instruction to perform a forward transformation. This instruction is identical to the instruction that initiated step 720, and is performed in an identical manner. The transposed intermediary data stored in XR is multiplied by the transformation matrix 630, and is then written back, transposed, into XR. The result is that the final transformed matrix is stored in XR, as a shown in FIG. 6, such that where block 625 was initially $x_{01}$, it is now $X_{01}$.

In some embodiments, a single SIMD instruction will instruct the video processor to perform a 2-D transformation of the initial pixel data. In such embodiments, steps 720 and 730 can be combined into a single step, during which a 1-D transformation of the initial data is performed, the transposed intermediary matrix is written back to XR, a 1-D transformation of the intermediary matrix is performed, and the final non-transposed transformed matrix is written back to XR.

In step 740, the transformed matrix, [X], is written out to memory. Some embodiments may not perform this step, particularly those embodiments that will then proceed to forward quantization, as is detailed further below.

The embodiment detailed in FIG. 7 provides substantial advantages over traditional software implementations of the forward transform for the H.264 standard. In particular, the method of FIG. 7 accomplishes in 2 to 4 processor cycles what a software implementation requires 40 to 112 cycles to perform. Some additional gains are also made as a result of hard coding the transformation matrix 630 into the hardware of video processor 190, in that there is no need to access and load the transformation matrix from memory.

Figure 8:
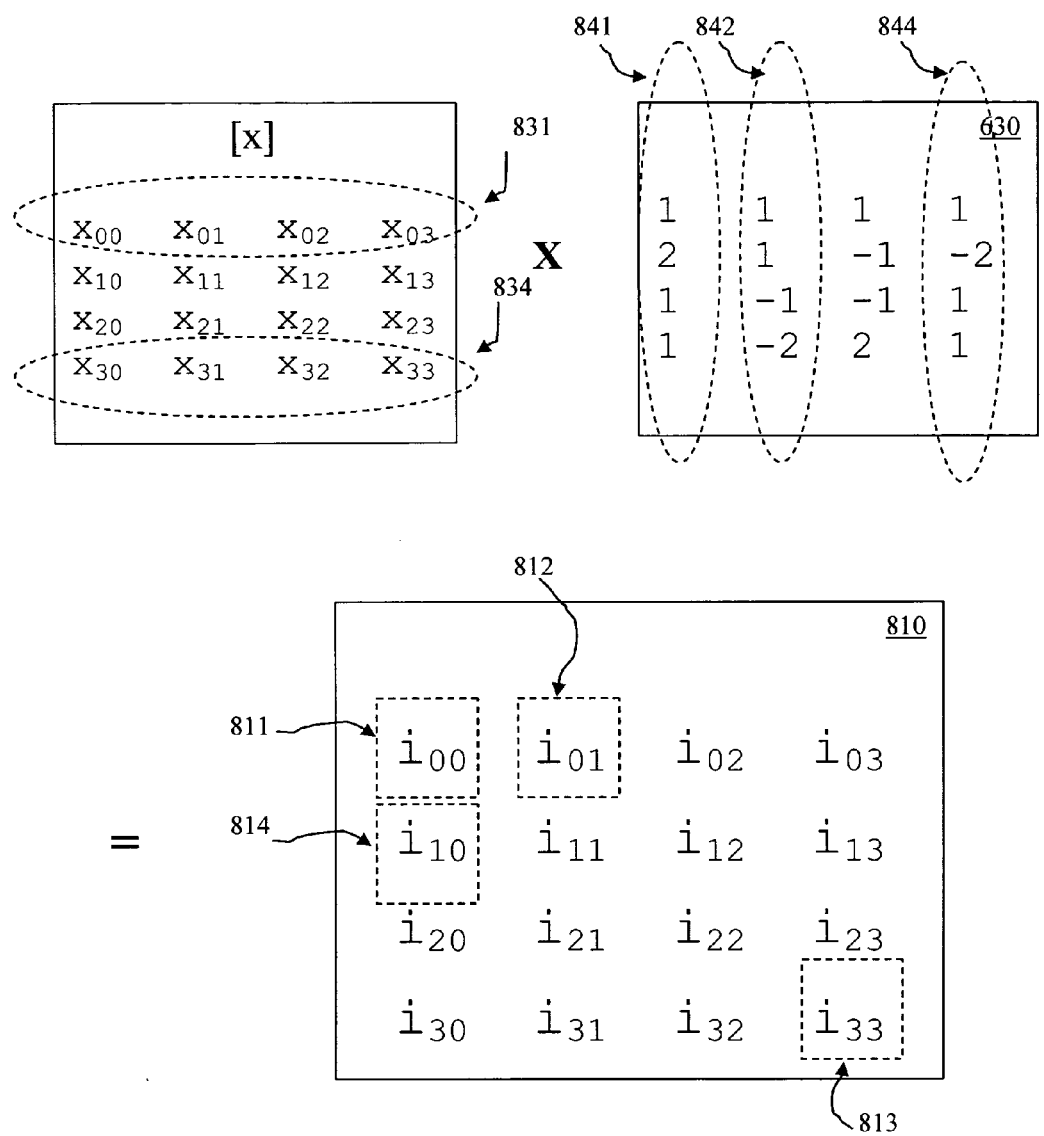
FIG. 8 depicts the multiplication of a pixel data matrix with a forward transformation matrix.

With reference now to FIG. 8, the math underlying the multiplication of the pixel data matrix by the transformation matrix is illustrated, in accordance with one embodiment of the present invention.

Matrix 230 is multiplied by a transformation matrix 630 to produce intermediary matrix 810. To produce element 811 of intermediary matrix 810, the first row of matrix 230, row 831, is multiplied by the first column of transformation matrix 630, column 841. This mathematical operation is set forth in detail below, in Table 2.

Table 2

Calculating One Element of Matrix Multiplication $i_{00} = x_{00}(1) + x_{01}(2) + x_{02}(1) + x_{03}(1)$ To produce element 812 of intermediary matrix 810, row 831 of matrix 230 is multiplied by the second column of transformation matrix 630, column 842. This trend continues with element 813 of intermediary matrix 810 resulting from multiplying of matrix 230 by column 844 of transformation matrix 630.

Intermediary matrix 810 is then transposed, e.g., element 812 and element 814 trade places, and the transposed intermediary matrix is then multiplied by transformation matrix 630. The result of that multiplication is the transposed transformed matrix. Transposing the transposed transformed matrix results in the final matrix, the transformed matrix.

Figure 9:
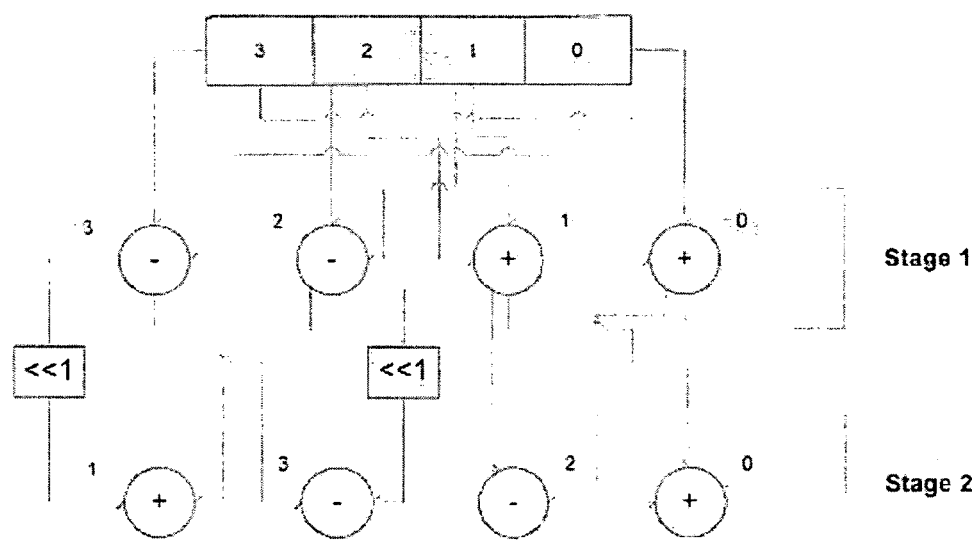
FIG. 9 depicts a hardware implementation of matrix multiplication for forward transformation, in accordance with one embodiment of the present invention.

With reference now to FIG. 9, the hardware underlying multiplier 640 is depicted, in accordance with one embodiment of the present invention. In this embodiment, the transformation matrix 630 is integral to multiplier 640, such that no seek or load operation is required to bring transformation matrix 630 into multiplier 640. Additionally, this embodiment of multiplier 640 is implemented solely as a combination of sign changes, adding, and bit shifting, operations that duplicate the results of matrix multiplication, but without the need to perform expensive computational tasks such as multiplication.

In the embodiment depicted in FIG. 9, the SIMD instruction implementing the forward transform has been implemented as a two cycle instruction, e.g., to processor cycles are allocated to complete the forward transform. One reason for such implementation is to allow for greater processor clock speed, by decreasing the number of actions that must be completed in a single processor cycle. In other embodiments, the forward transformation need not be divided into two stages.

Inverse Transformation

Inverse transformation also makes up an important part of the H.264 specification. Specifically, the H.264 specification allows for motion estimation and other predictive approaches to compression. These predictions are accomplished, in part, by referencing previous frames. As such, it is often necessary to decompress a compressed frame, in order to be able to extract information needed for prediction. Therefore, every forward process defined by the H. to 264 standard implies a corresponding inverse process. For forward transformation, the inverse process is inverse transformation.

Figure 10:
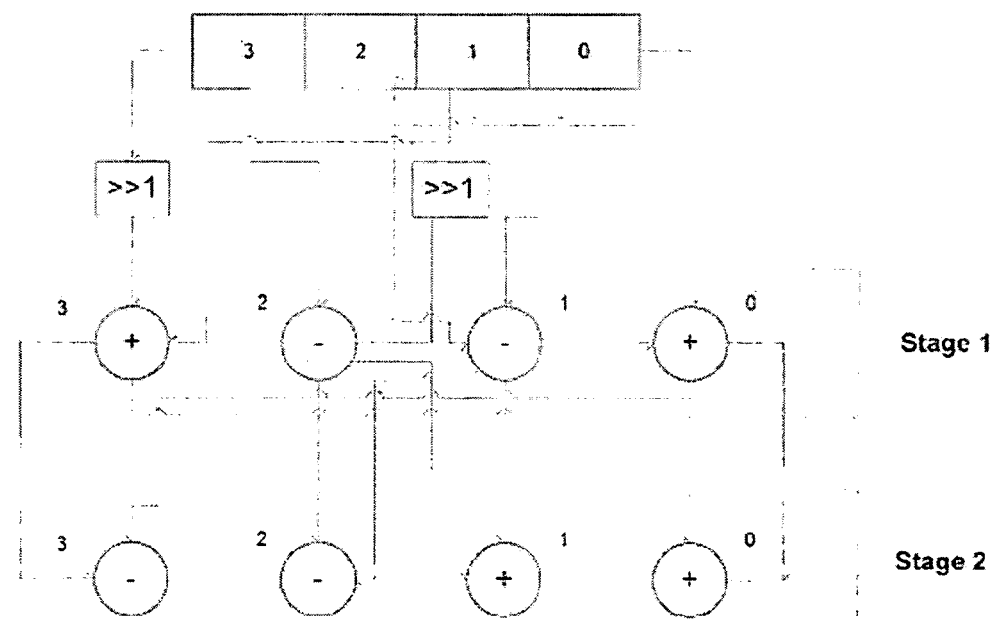
FIG. 10 depicts a hardware implementation of matrix multiplication for inverse transformation, in accordance with one embodiment of the present invention.

The inverse transformation process is much like the forward transformation process. Rather than using the transformation matrix, e.g. translation matrix 630, the inverse of the transformation matrix is utilized. Otherwise, the steps detailed above for forward transformation applying similarly to inverse transformation. In some embodiments, a different SIMD instruction is issued in order to initiate inverse transformation. Also, the hardware underlying the multiplier, e.g. multiplier 640, requires slightly different pathways, as shown in FIG. 10. However, this hardware is similar enough that in some embodiments, the same hardware components can be reused for both forward and inverse transformation. In other embodiments, different hardware components are used, e.g., to avoid creating a hardware bottleneck.

Hadamard Transform

Figure 11:
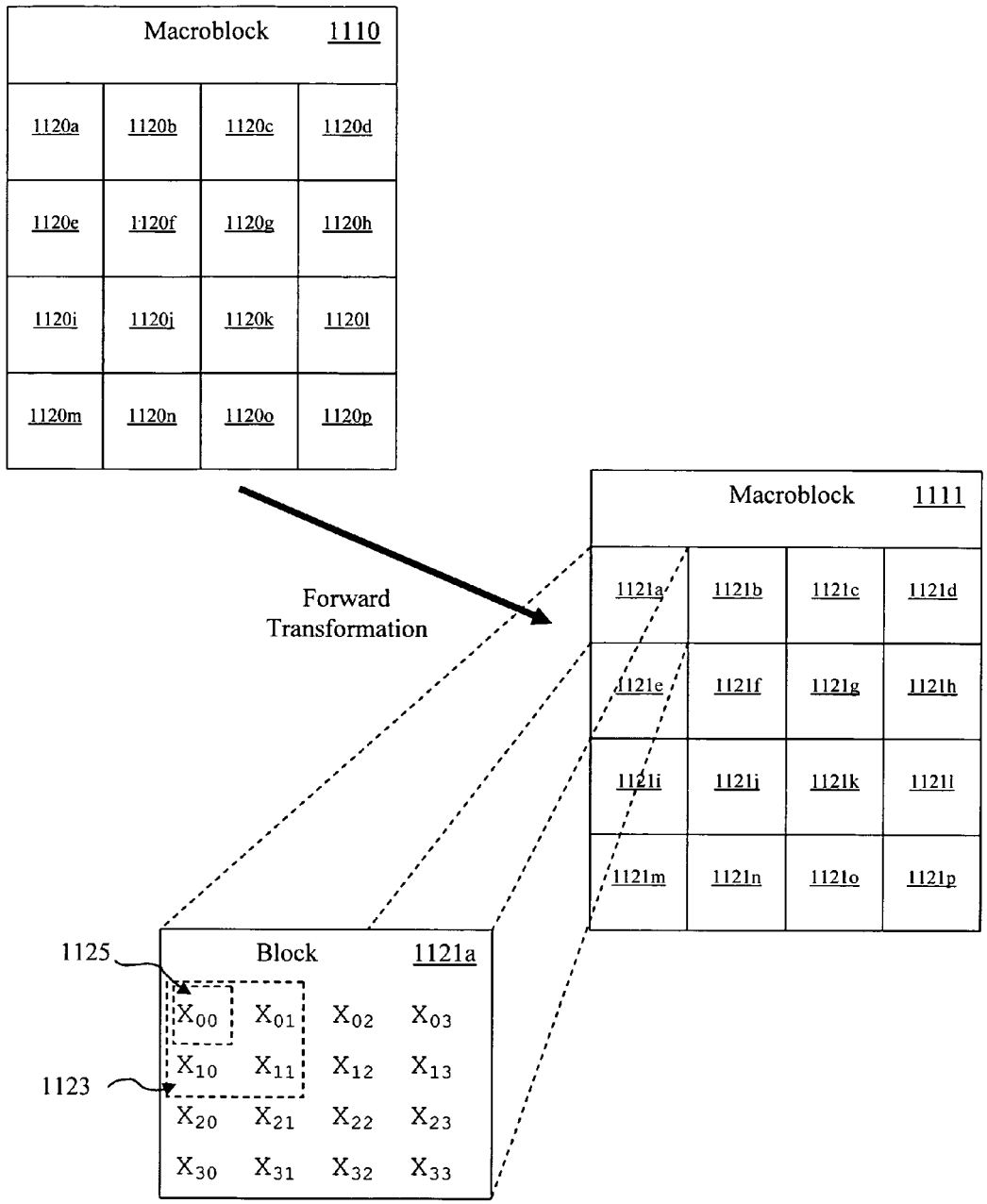
FIG. 11 depicts the progression of a single macroblock through several steps of the H.264 encoding process, in accordance with one embodiment of the present invention.

With reference now to FIG. 11, the progression of a single macroblock 1110 through several steps of the H.264 encoding process is illustrated, in accordance with one embodiment of the present invention. Macroblock 1110 is shown here as including 16 blocks 1120a through 1120p; in other embodiments, different sized blocks or macroblocks can be used. Each block 1120 passes through the forward transform process outlined above, resulting in 16 forward transform blocks, blocks 1121a through 1121p. These 16 forward transform blocks make up the forward transform macroblock 1111.

One useful property of the forward transform process is that the more significant data points are collected and condensed into just a few block elements, e.g., the four elements in the upper left corner a block, as shown by region 1123 of block 1121a. The single most significant data point, e.g., element 1125 of block 1121a, is referred to as the DC element or value. The remainder of the values of the block are collectively referred to as AC values. The block, with the DC value removed, can be referred to as an AC block. As used in the art and the H.264 standard, DC and AC are well understood terms.

Figure 12:
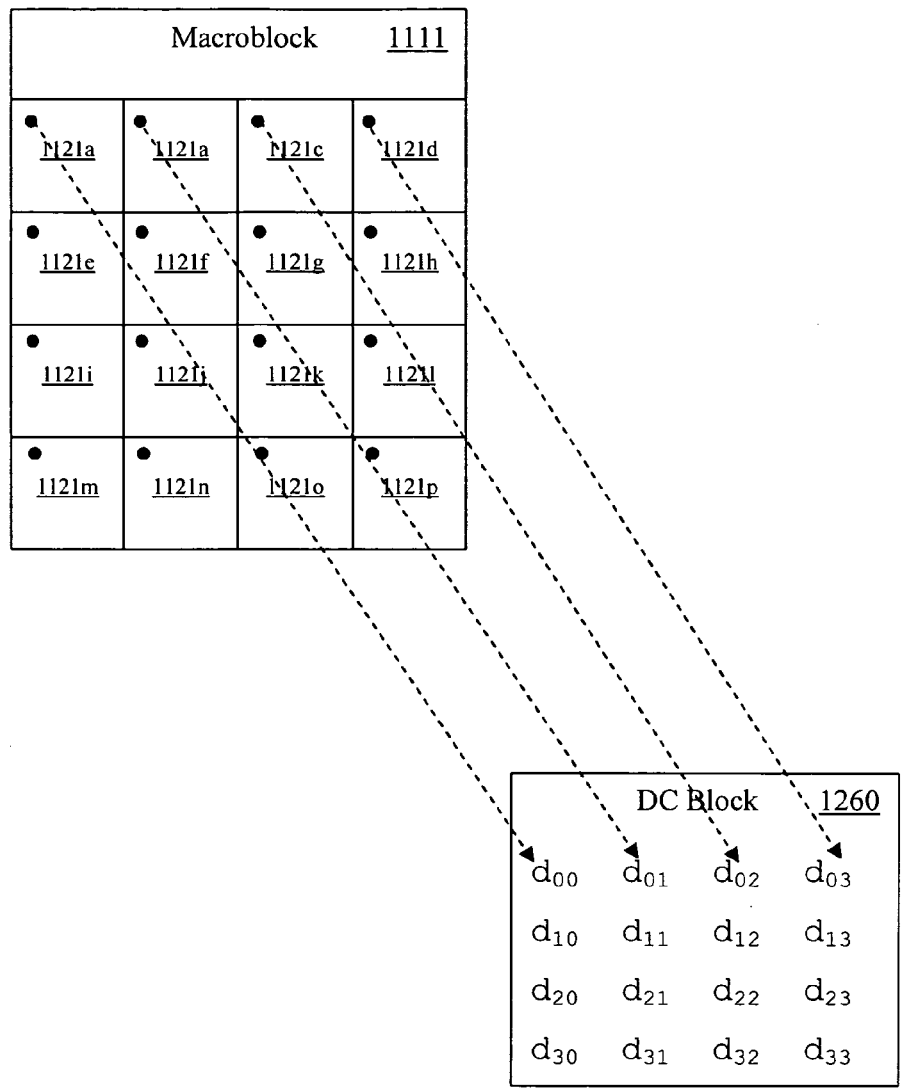
FIG. 12 depicts the assembly of a DC block from a macroblock, in accordance with one embodiment of the present invention.

With reference now to FIG. 12, the assembly of a DC block is depicted, in accordance with one embodiment of the present invention. In the depicted embodiment, the 16 DC values in macroblock 1111 are next collected into a single block, e.g., DC block 1260. These DC values are removed from the individual forward transform blocks of macroblock 1111, leaving 16 AC blocks.

It is understood that the order in which the operations described above can change, in different embodiments of the invention.

Under a number of conditions specified by the H.264 standard, this DC block undergoes a Hadamard transform process. The Hadamard transformation process allows for even greater compression of data, as the most significant, correlated data points from each of the 16 blocks in the macroblock are further correlated. The Hadamard transformation process is similar to the forward transformation process, outlined above. The DC block, e.g., DC block 1260, undergoes a 2-D transformation via a transformation matrix specified by the H.264 standard.

Prior art software implementations of the standard therefore followed the same procedure laid out in FIG. 5a, namely a 1-D transformation along the rows, a transposition of the intermediary, a second 1-D transformation along the columns, and a second transposition, to produce the final Hadamard transformed block. The problems with this procedure are identical with those specified above for the forward transformation process, e.g., a large number of processor cycles is involved in order to reach the final result.

Figure 13:
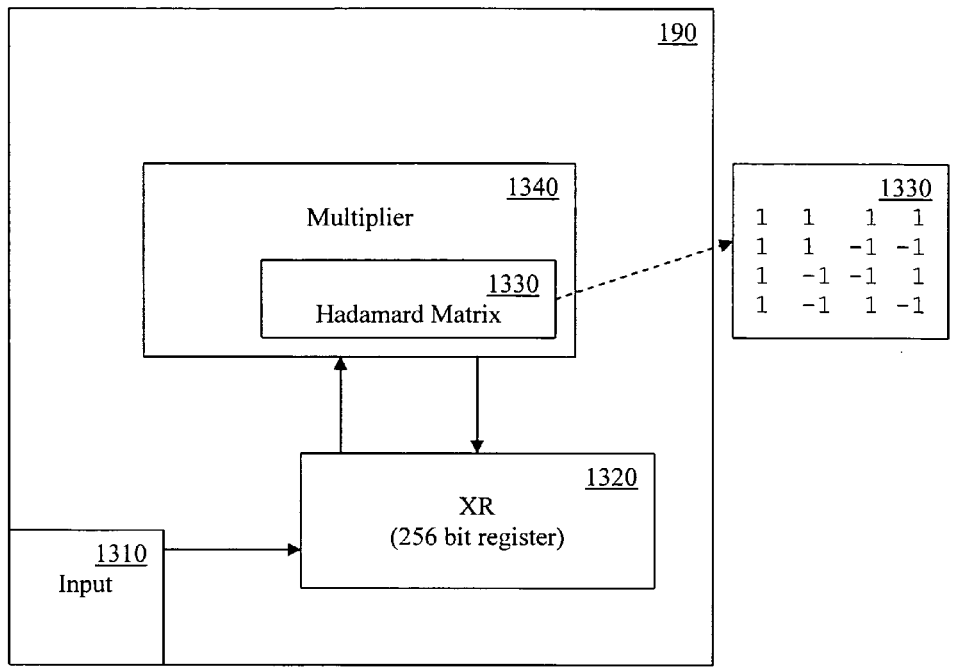
FIG. 13 depicts a video processor, configured to perform a Hadamard transform, in accordance with one embodiment of the present invention.

With reference now to FIG. 13, a video processor 190 is depicted, in accordance with one embodiment of the present invention. Video processor 190 in this embodiment is configured to implement the Hadamard transformation process associated with the H.264 standard. Although video processor 190 is shown as including a number of discrete components, it is understood that in other embodiments, different components might be utilized, components might be combined, or components might be separated.

Video processor 190 includes an input 1310, through which data can be received. In some embodiments, video processor 190 also receives SIMD instructions from controlling software through input 1310. In other embodiments, video processor 190 receives instructions from an alternate input (not shown).

Video processor 190 includes a register 1320. In this embodiment, register 1320 shown as a SIMD vector, capable of holding 16 elements. In other embodiments, the length of register 1320 may vary. In some embodiments, two shorter registers 1320 are utilized in place of one longer register.

Video processor 190 is depicted as incorporating Hadamard transform matrix 1330. In the preferred embodiments, Hadamard transform matrix 1330 is hardwired into video processor 190, thus obviating the need to preload the Hadamard transform matrix values into video processor 190. In other embodiments, Hadamard transform matrix 1330 is implemented as a register, similar to register 1320, and loaded with the values associated with the Hadamard transform matrix.

Video processor 190 includes multiplier 1340. In this embodiment, multiplier 1340 multiplies the value stored in register 1320 by the Hadamard transform matrix 1330, and writes back to register 1320. This is discussed in greater detail below.

Figure 14:
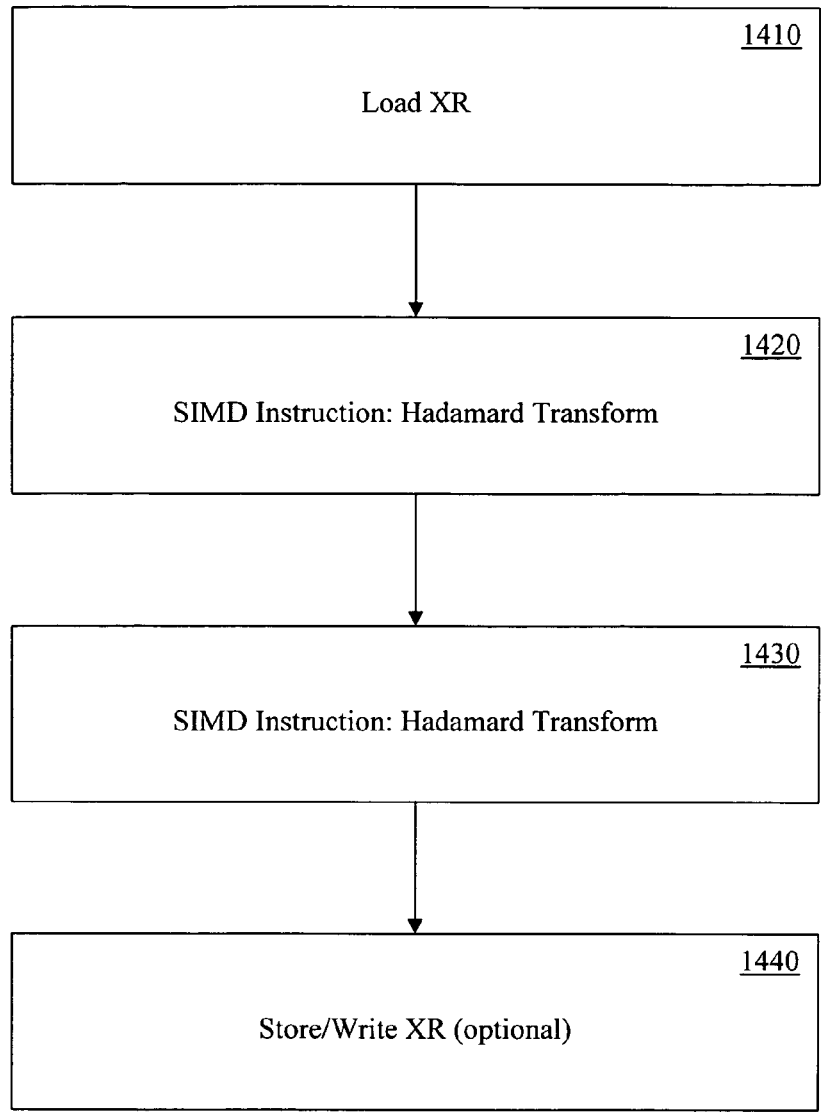
FIG. 14 depicts a flowchart of steps performed during a Hadamard transformation of a DC block, in accordance with one embodiment of the present invention.

With reference now to FIG. 14, a flowchart of the method of performing a Hadamard transformation is depicted, in accordance with one embodiment of the present invention. Although specific steps are disclosed in flowchart 1400, such steps are exemplary. That is, embodiments of the present invention are well suited to performing various other (additional) steps or variations of the steps recited in flowchart 1400. It is appreciated that the steps in flowchart 1400 may be performed in an order different than presented, and that not all of the steps in flowchart 1400 may be performed.

With reference now to step 1410 and FIG. 13, a DC block, e.g. DC block 1260, is loaded into a register, register XR. In one embodiment, XR, or register 1320, is a 16 element SIMD vector. When dealing with 8-bit pixel values, is convenient for each element of XR to support 16 bits; in such embodiments, therefore, XR is a 256 bit register. In other embodiments, different size registers may be used, or several registers may be used in order to store the block of data.

In the depicted embodiment, data enters video processor 190 via input 1310, e.g., a connection to a system bus.

The DC block, [d], is stored as shown in FIG. 13. For example, value $d_{00}$ is stored in element 1321, value $d_{01}$ is stored in element 1325, and value $d_{10}$ is stored in element 1326. Other arrangements of DC block data are equally valid.

In step 1420, the video processor acts upon a SIMD instruction to perform a Hadamard transformation. In one embodiment, this instruction is issued by controlling software. Upon receiving this instruction, video processor 190 performs the 1-D transformation of the DC block data stored in XR. Multiplier 1340 multiplies the data in XR by the Hadamard transform matrix 1330. The intermediate matrix that results from this 1-D transformation is then written back to register XR. When the intermediate matrix is written back to XR however, it is written back in a transposed form. This is depicted in FIG. 13, such that where block 1325 used to hold $d_{01}$, it now contains $i_{10}$, and where block 1326 once held $d_{10}$, it now contains $i_{01}$.

But performing this transposition during the writeback of the intermediate matrix, the present embodiment gains a significant performance advantage over prior art software implementations. Specifically, where the software implementation required four to 16 cycles to perform the multiplication of the matrices, and a further 16 to 20 cycles to perform a transposition, embodiments of the present invention can perform both steps in just one to two cycles, depending on bus widths and processor speed.

In step 1430, the video processor acts upon a second SIMD instruction to perform a Hadamard transformation. In some embodiments, this instruction is identical to the instruction to initiate step 1420, and is performed in an identical manner. The transposed intermediary data stored in XR is multiplied by the Hadamard transform matrix 1330, and is then written back, transposed, into XR. The results is that the final Hadamard transform to matrix is stored in XR, as shown in FIG. 13, such that where block 1325 was initially $d_{01}$, it is now $H_{01}$.

In some embodiments, a single SIMD instruction will instruct the video processor to perform a 2-D Hadamard transformation of the initial DC block. In such embodiments, steps 1420 and 1430 can be combined into a single step, during which a 1-D transformation of the initial data is performed, the transposed intermediary matrix is written back to XR, a 1-D transformation of the intermediary matrix is performed, and the final non-transposed Hadamard transform matrix is written back to XR.

In step 1440, the Hadamard transformed matrix, [H], is written out to memory. Some embodiments may not perform this step, particularly those embodiments that will then proceed to quantize the Hadamard transformed matrix, as is detailed further below.

The embodiment detailed in FIG. 14 provides substantial advantages over traditional software implementations of the Hadamard transform for the H.264 standard. In particular, the method of FIG. 14 accomplishes in two for processor cycles what a software implementation requires 40 to 112 cycles to perform. Additional significant gains are also made as a result of hard wiring the Hadamard transform matrix 1330 into the hardware of video processor 190, in that there is no need to access and load the Hadamard transformation matrix from memory.

As with forward transformation, the H.264 standard requires an inverse process with the Hadamard transformation. Unlike forward transformation, however, the Hadamard transformation matrix remains the same for both forward and inverse transformation processes. As such, in some embodiments, the same SIMD instruction can be used to implement both forward and inverse Hadamard transformation.

Also like forward transformation, in some embodiments, the Hadamard transformation matrix can be implemented as part of the structure of multiplier 1340. Because the Hadamard transformation matrix is composed exclusively of 1s and −1s, no bit shifters are necessary to implement the function; all operations can be performed using adders and sign changing gates. In some embodiments, the same hardware utilized for forward and inverse transformation can also be used to implement Hadamard transformation. In such embodiments, it is never necessary to perform a forward or inverse transformation at the same time as a Hadamard transformation. Such an implementation represents a significant savings in terms of dedicated hardware, as well as silicon real estate, as no additional gates need to be included on the die.

Forward and Inverse Quantization

In some embodiments, after passing through a forward transformation process, forward transformed data blocks are passed through a quantization process. Each value, or coefficient, in the transformed data block is manipulated according to equations presented below, in Table 3. These equations are specified by the H.264 standard.

Table 3

Quantization Calculations

QP=Quantization step size
$Q_{coeff}$=Sign (Z)

Z=[Abs(Coefficient)*MF+Rounding Value (RV)]/SF

Several of the elements that appear in these equations, e.g., the multiplication factor (MF), the rounding value, and the scaling factor (SF), differ significantly depending upon other considerations. Example factors which influence these elements include whether forward or inverse quantization is being performed; whether the frame in question is of the intra or inter type; the position of the coefficient within the transformed data block; the quantization step size (QP); and a number of additional factors, specified by the H.264 standard.

Because of the many possible values for the variables in the equation, and the number of factors that can affect which values of the variables are used, prior art implementations of the quantization process were necessarily complex. In software solutions, for example, a significant amount of processing power, e.g., a number of cycles, must be dedicated to simply determining which values using the equation, before the equation itself is processed.

Embodiments of the present invention seek to avoid the software complexity associated with the decision-making process. To that end, several important innovations have been made.

Figure 15:
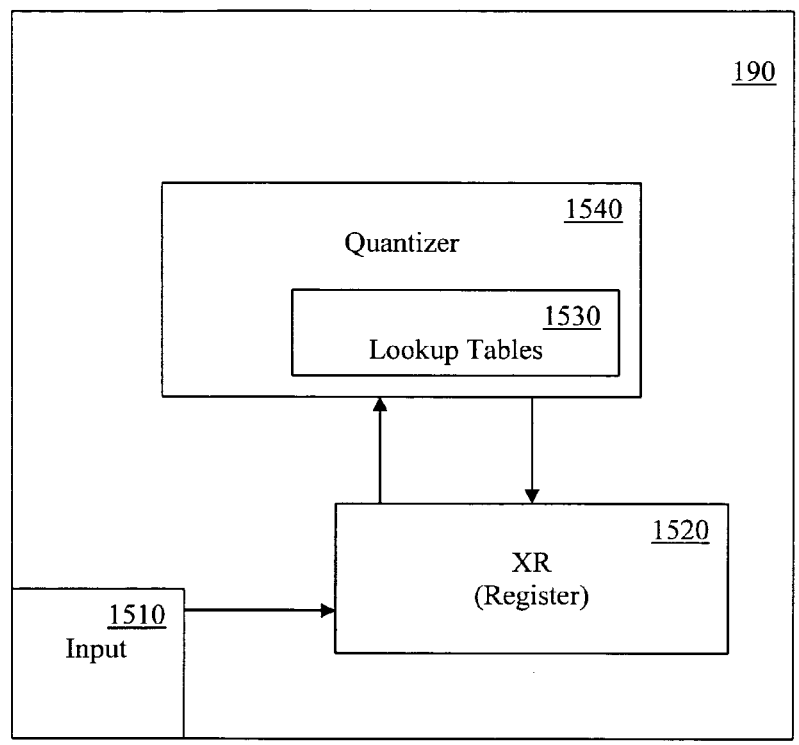
FIG. 15 depicts a video processor, configured to implement the quantization process associated with the H.264 standard, in accordance with one embodiment of the present invention.

With reference now to FIG. 15, a video processor 190 is depicted, in accordance with one embodiment of the present invention. Video processor 190 in this embodiment is configured to implement the quantization process associated with the H.264 standard. Although video processor 190 is shown as including a number of discrete components, it is understood that in other embodiments, different components might be utilized, components might be combined, or components might be separated.

Video processor 190 includes an input 1510, through which data can be received. In some embodiments, video processor 190 also receives SIMD instructions from controlling software through input 1510. In other embodiments, video processor 190 receives instructions from an alternate input (not shown).

Video processor 190 includes a register 1520, labeled XR. In this embodiment, register 1520 shown as a SIMD vector, capable of holding 16 elements. In other embodiments, the length of register 1520 may vary. In some embodiments, two shorter registers 1520 are utilized in place of one longer register.

Video processor 190 is depicted as incorporating one or more quantization lookup tables 1530. In the preferred embodiments, these quantization lookup tables 1530 are hardwired into video processor 190, thus obviating the need to preload the data values contained thereon into video processor 190. In other embodiments, the quantization lookup tables are implemented as a register, similar to register 1520, and loaded with the values associated therewith.

Video processor 190 includes quantizer 1540. In this embodiment, quantizer 1540 performs quantization processes upon the data stored in register 1520, as is discussed in greater detail below.

SIMD Instructions and Quantization

In one embodiment, two SIMD instructions have been incremented for video processor 190. The first, init_zero, goes through several top-level decisions regarding which values are to be used for solving the quantization issue. The second SIMD instruction, init_one, takes the high-level decisions made by the first, as well as some additional data regarding the forward transformed data block, and determines which values of MS, SF, and the rounding value are appropriate for this calculation.

Because init_zero addresses only top-level decisions, in some embodiments it only needs to be called once for each forward transformed block. Init_one, however, in some embodiments is called for each coefficient in the block; in other embodiments, init_one needs to be called every row, e.g., every four coefficient values. Unlike software implementations, which traverse the entire decision tree for every single coefficient, embodiments of the present invention bypass many redundant calculations in this way.

Additionally, in some embodiments, some or all of the possible factors relating to choosing values for MF, SF, and the rounding value are hardwired into the video processor. In this way, when the instructions are called, no time-consuming memory accessing, searching, or loading needs to occur during the decision-making process.

A related innovation, in one embodiment, is that all possible values of MF, SF, and RV, which are specified by the H.264 standard, have been hardwired into the video processor itself. As such, once the appropriate value is determined, no time-consuming memory lookup or load operations need to be performed before the quantization calculations can be made. Because the H.264 standard defines specifically the way in which each of these factors is determined, and because there are only a limited number of possible values, every possible value can be hardwired into a lookup table. Rather than needing to perform calculations and manipulations of data, the lookup tables can be addressed using the values already known to the video processor, e.g., the row number of the block currently being processed, or the macroblock number.

In other embodiments, a similar improvement in overall performance could be realized with additional registers, into which the look up tables are loaded, e.g., at system power-up or when compression or decompression routines are originally invoked, and stored for easier access.

A third SIMD instruction, compute, in one embodiment, performs the actual calculation of the quantized coefficient. In some embodiments, the compute instruction is performed once every row. In other embodiments, the compute instruction is performed for each individual coefficient.

For both init_one and compute, the frequency with which they are executed is directly related to the capability of the hardware available. Embodiments of the present invention can be utilized to process more than one row of the data block at one time, provided adequate hardware resources are available.

Table 4, below, depicts the relationship between the quantization variables and the SIMD instructions.

TABLE 4

| Instruction: | Input: | Output: |
| --- | --- | --- |
| init_zero | q_type (forward/inverse) mode (I or P/intra or inter) QP | (Outcome influences which tables are accessed by init_one) |
| init_one | Row number XR | $XR_{in}$ = {Abs(coeff), MF, RV, SF) |
| compute | $XR_{in}$ | $XR_{out}$ (set of $Q_{coeff}$) |

According to the H.264 standard, determining the appropriate value for both MF and SF requires performing some computation, e.g., for MF, QP%6, and for SF, QP/6. Both of these tasks are relatively expensive, in terms of processor cycles. Accordingly, the present invention incorporates cycle-saving techniques for both MF and SF. For example, given that the standard defines only 52 possible values for QP, lookup tables have been substituted for the computational tasks in some embodiments. These lookup tables, in some embodiments, are implemented in hardware, so as to avoid unnecessary memory accesses or searches. While this approach requires some additional hardware, it results in a much faster operation than performing a division or modulus task. In other embodiments, some of which support extended versions of the H.264 standard, lookup tables are hardwired to support additional possible values for QP as needed.

Table 5, below, depicts the quantization variables and some related calculations.

TABLE 5

| Variable: | Arguments: |
| --- | --- |
| MF | (QP%6, i, j) [(i,j) correspond to coefficient position within the data block] |
| SF | (15 + QP/6) |
| RV | (QP, mode) [RV is an if/else scenario, rather than a mathematical calculation] |

In some embodiments, given the implementation of init_zero, the same SIMD instructions can initiate both forward and reverse quantization. In other embodiments, one or more additional SIMD instructions may be necessary to implement forward and reverse quantization. In some of these latter embodiments, the same hardware can perform both instructions.

Embodiments of the present invention offer a number of new advantages over prior art implementations of the H.264 standard, as applied to quantization. For example, the utilization of SIMD instructions, in conjunction with appropriate hardware, leads to greatly reduced processor cycle requirements that the previous prior art software implementation. Putting decision-making and computational tasks in hardware is also highly effective. Additionally, the use of hardwired lookup tables, rather than performing expensive division and modulus operations, allows for substantial improvement in performance over software implementations.

Figure 16:
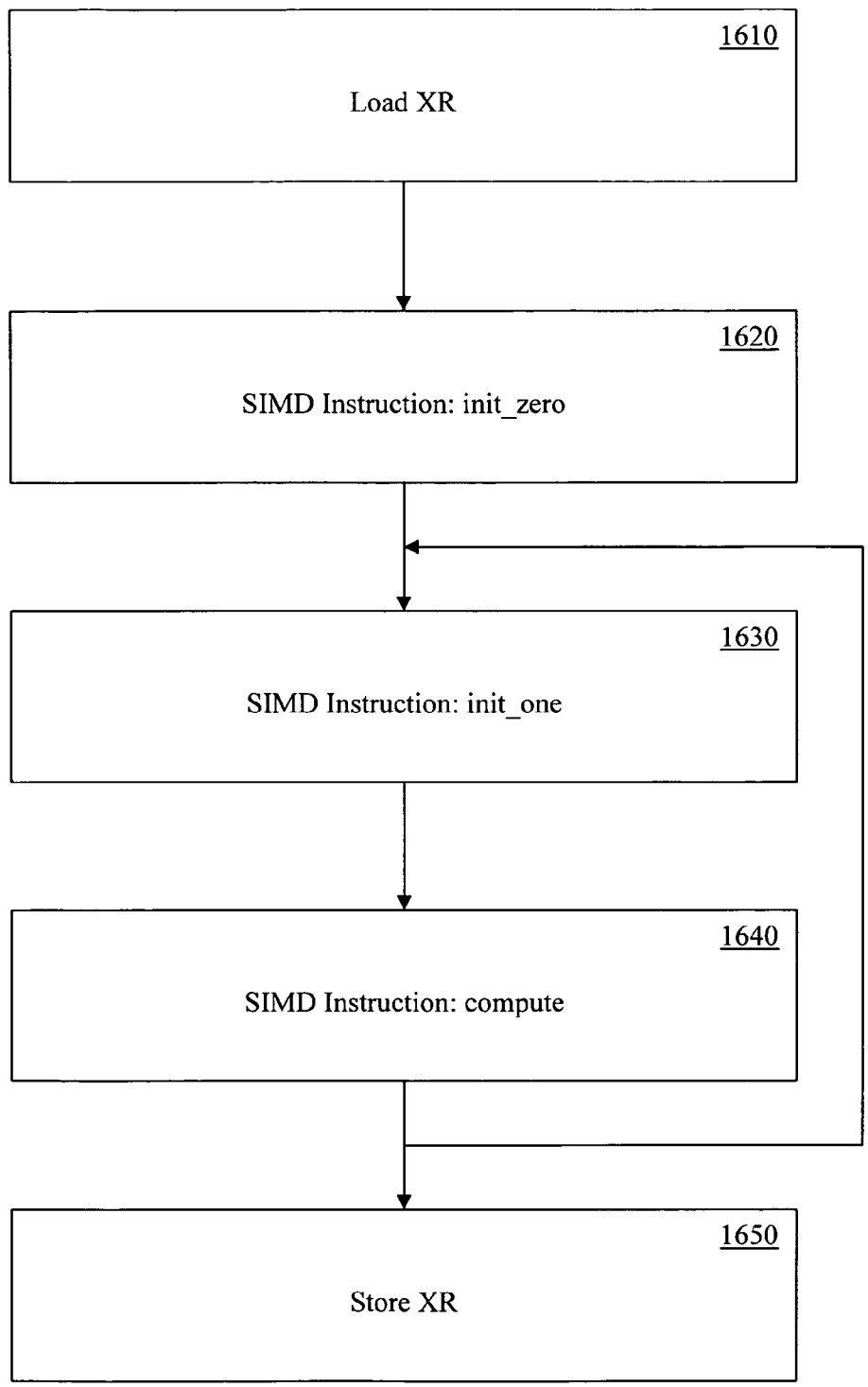
FIG. 16 depicts a flowchart of a computer implemented method of performing a quantization process, in accordance with one embodiment of the present invention.

With reference now to FIG. 16, a flowchart of a method of performing a quantization process is described, in accordance with one embodiment of the present invention. Although specific steps are disclosed in flowchart 1600, such steps are exemplary. That is, embodiments of the present invention are well suited to performing various other (additional) steps or variations of the steps recited in flowchart 1600. It is appreciated that the steps in flowchart 1600 may be performed in an order different than presented, and that not all of the steps in flowchart 1600 may be performed.

With reference now to step 1610 and FIG. 15, a block of data to be quantized is loaded into a register. In some embodiments, this block is received into video processor 190 through input 1510, and stored in XR 1520. In other embodiments, the data may already be loaded into XR 1520 as the result of a preceding step, e.g., transformation. In some embodiments, where the macroblock being processed is subject to Hadamard transformation, the data block may be an AC block.

With reference now to step 1620 and FIG. 15, the block stored in the register is subjected to the first SIMD instruction, init_zero. Quantizer 1540, in the depicted embodiment, retrieves the stored block from XR 1520, and carries out SIMD instruction init_zero. As discussed above, in some embodiments, init_zero performs operations that only need to be performed a limited number of times for the block of data of data stored in XR, e.g., operations that only need to be performed once per block. In some embodiments, such operations include determining which lookup tables are applicable to the block being processed, e.g., by determining whether forward or inverse quantization is to be performed. In many embodiments, the decisions carried out in this step are embodied in the quantization lookup tables 1530, and the decision involves cross-referencing one or more hardwired lookup tables with the data block stored in XR 1520.

With reference now to step 1630 and FIG. 15, the second SIMD instruction, init_one, is applied to the data block. Quantizer 1540, with reference to the outcome of init_zero, performs a number of operations upon the data block stored in XR 1520. In some embodiments, for example, Quantizer 1540 accesses the quantization lookup tables 1530, to determine the appropriate values of variables to be used in calculating the quantized coefficients.

With reference now to step 1640 and FIG. 15, a third SIMD instruction, compute, is applied to the data block. Quantizer 1540 performs the necessary calculations to determine the quantized coefficients. In some embodiments, additional lookup tables are utilized to avoid computationally-expensive operations, e.g., division.

In the embodiment depicted in flowchart 1600, steps 1630 and 1640 are looped, such that they are repeated in order until the data block in XR 1520 has been fully quantized. In some embodiments, init_one and compute are executed once per row. In other embodiments, they are executed once per coefficient. In other embodiments, different numbers of executions may be necessary.

With reference now to optional step 1650 and FIG. 15, the quantized data block is written out to memory. Some embodiments may not perform this step, keeping the quantized data block in register XR for further manipulation.

Embodiments of the present invention incorporate a number of novel features. First is the combination of SIMD computation with decision-making instructions, such as init_zero or init_one.

Another is the dramatic reduction in processor cycles occasioned by using hard-wired lookup tables, instead of performing calculations.

Another is the separation of quantization from quant-parameter calculation, as well as the subdivision of the quant-parameter calculations into high-level and low-level, which allows for more precision in terms of what calculations are performed when, and eliminates redundant lookups.

Another is the method in which MF is determined, by basing the determination upon the position of the coefficient within the block; more specifically, only the incremented row number currently being processed is passed to init_one, and the location of the coefficient within the register identifies the exact position within the block.

Another is the decomposition of quantization and inverse quantization into one common SIMD instruction, e.g., init_one, which performs the same operations regardless of whether quantization or inverse quantization is being performed, and one differentiating SIMD instruction, which behaves differently for quantization and inverse quantization.

Another novel feature is a SIMD instruction which performs calculations for MF for multiple coefficients in a single processor cycle, as well as a SIMD instruction which performs calculations for multiple quantized coefficients in a single cycle.

Additionally, some embodiments benefit from the separation of control, in software, from data manipulations, performed in hardware.

Bitstream Generation

Some embodiments of the present invention include a SIMD instruction to implement a bitstream generator for an encoder. A bitstream generator is used in many applications to produce an outgoing stream of data bits. In some such applications, e.g., video encoding, the encoding process does not generate a constant number of bits. For example, the H.264 standard specifies the use of variable length coding (VLC), specifically Huffman coding for the compression and encoding of video data.

Variable length coding is a well-known method of compressing data. The most commonly occurring data point is replaced with the smallest-available replacement value, while less commonly occurring data points are replaced with larget replacement values. When an entropy encoder has put bits in a bitstream, the number of bits will therefore vary, e.g., according to a VLC scheme. By means of illustration, if the most commonly-occurring letter in a paragraph was "e", that letter could be replaced by a binary 1 (one); meanwhile, the letter "z", which occurs far less frequently, could be replaced by a binary 11010 (26). The advantage gained by variable length coding is that the more commonly occurring data points can be transmitted faster, as they are shorter in length. The problem is that data transmission is generally accomplished using data containers of a fixed, known length, e.g., packets.

Embodiments of the present invention extend to any encoding or compression process in which variable length coding is utilized. The following exemplary embodiments present an application directed to the H.264 video compression standard; however, it is understood that these Embodiments are exemplary, and not limiting. Other embodiments of the present invention are applicable to other video compression and transmission approaches, as well as audio compression and transmission, and other fields. Further, while the exemplary embodiments discuss the invention in terms of VLC and Huffman coding, it is understood that embodiments are well suited to use with other forms of encoding or compression, in which data points of variable length are produced.

Embodiments of the present invention combine activities that, if implemented in software, would require a large number of operations and calculations, and perform these activities in relatively few processor cycles. In some embodiments, the SIMD instruction utilized combines data movement (e.g., loading the value component of VLC encoded data into an outgoing data buffer), data packing (e.g., loading a buffer until it is exactly full of the appropriate number of bits, and maintaining the overflow for later transmission), bookkeeping operations (e.g., transmitting buffer-full interrupts as necessary via an outgoing interface, and updating internal counters and memory pointers as necessary), and handshaking operations (e.g., communicating with an external host and making data available for drawing). In other embodiments, additional, fewer; or different tasks are performed.

Embodiments of the present invention can be utilized in implementing programmable video compression in a video processor. Common operations, e.g., operations common to multiple compression types and standards, have been implemented as hardware or hardware instructions. Variable or uncommon operations, e.g., operations which are subject to change or are only required by a limited number of compression standards, remain as software controlled.

Embodiments of the present invention include an instruction, such as a SIMD instruction, in a CPU that can accept VLC data, concatenate the bits received into fixed-width packages, and send the bitstream out to host processor. In several such embodiment, hardware instructions in a processor are combined with the firmware control structure to set the mode of operation of the instruction, and feed operands into the instruction. In other embodiments, a bitstream generator is described, which accumulates bits from VLC data into a buffer, examines the fullness of the buffer at each invocation of the bitstream generator, transfers newly received data, in whole or in part, to the buffer until the buffer is full, and stores the unwritten portion of the input into a separate spillover buffer. Other embodiments of the present invention include a bitstream generator, which receives input from a variable length coding process, collects this data into standard sized packages or packets, and performs necessary bookkeeping operations in order to facilitate the transmission of the data. Other embodiments of the present invention extend to a method of performing bitstream generation.

Data Packaging

In some embodiments, the function initiated by the SIMD instruction is the accumulation of data bits until reaching a prespecified number, e.g., 128 bits. When discount is reached, the bits are transferred to an output interface. Any "leftover" bits from the current entropy call, e.g., any bits that do not fit within the 128 bit limit, are also accumulated, and held until a next transfer of bits.

In some embodiments, a bitstream generator receives input from an entropy encoder or a VLC encoder. The input, in some embodiments, has two elements: a value component, the actual data value, and a length component, the length of the value component, e.g., the number of bits required to express the value. The bitstream generator will compare the length component against the available space in an outgoing data buffer. If sufficient space in the buffer remains, the value component is loaded into the buffer, and the available space in the outgoing data buffer is updated. If insufficient space remains in the buffer, the value component is used to completely fill the buffer, and the remainder or overflow is loaded into a second buffer. The buffer space remaining counter is updated to reflect the new buffer, taking into account the space used by the overflow. In some embodiments, a single continuous memory location is subdivided into multiple buffers. In other embodiments, discontinuous memory locations can be utilized as buffers, or more than one memory element can be used. The number of buffers used will change across different embodiments; for example, in one embodiment, four buffers are used.

Figure 17:
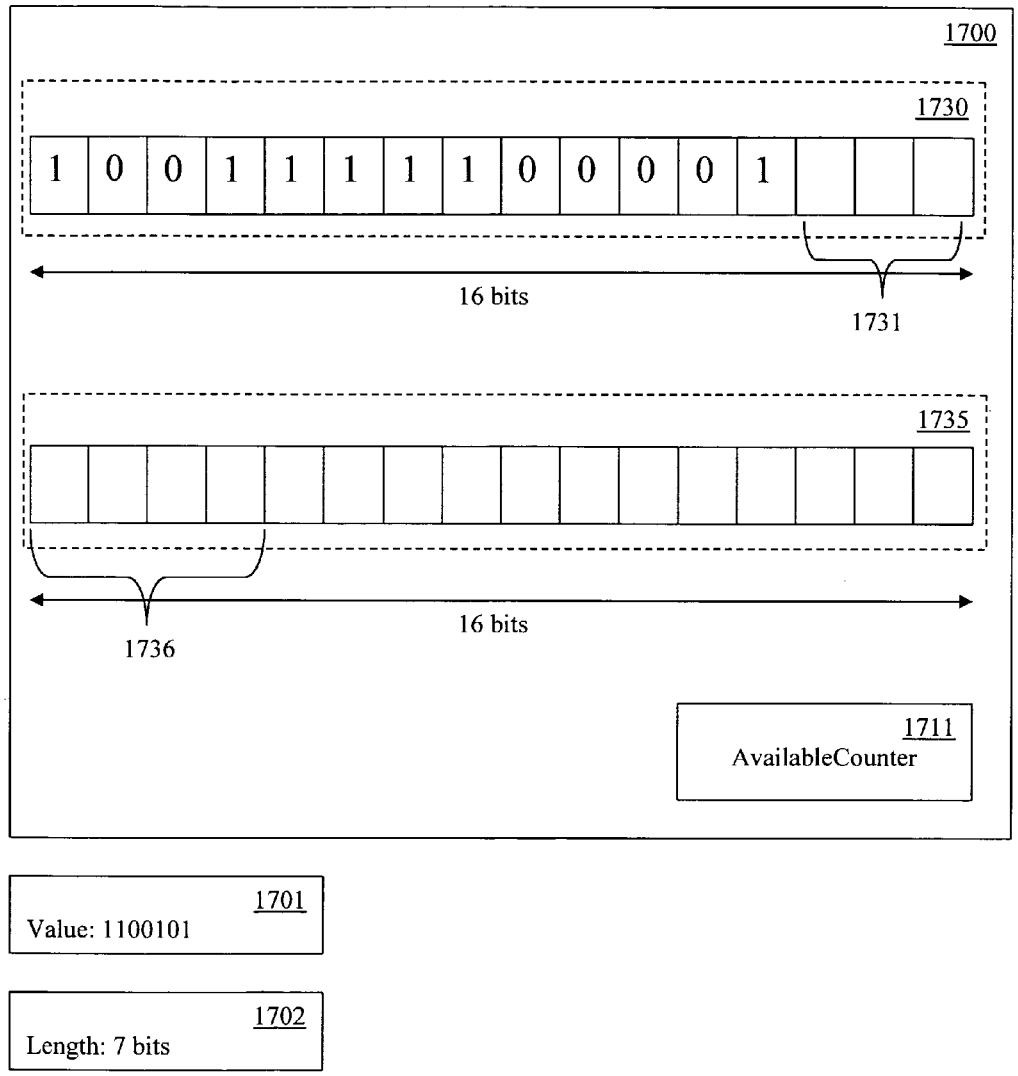
FIG. 17 depicts an illustration of a multiple buffer arrangement for data output, in accordance with one embodiment of the present invention.

With reference now to FIG. 17, an illustration of this multiple buffer arrangement is depicted, in accordance with one embodiment of the present invention. Bitstream generator 1700 is depicted as having two buffers, output buffer 1730, and overflow buffer 1735. Each of these buffers is depicted as being 16 bits in length, e.g., they are full when they contain 16 bits of data. Output buffer 1730 shown as currently holding 12 bits, with four bits available in available region 1731. The available space is reflected by available counter 1711, currently set to four bits. When bitstream generator 1700 receives input from an entropy encoder, it receives value component 1701 and length component 1702. Value component 1701 is seven bits in length, as indicated by length component 1702. Bitstream generator 1700 writes the first four bits of value component 1701 into available region 1731, which completely fills output buffer 1730. The remaining three bits of value component 1701 are written into region 1736, the first three bits of overflow buffer 1735. Available counter 1711 is then updated to point to overflow buffer 1735, and indicates that 13 bits of overflow buffer 1735 are available.

When a buffer is full, e.g., when output buffer 1730 reaches 16 bits, in some embodiments, the bitstream generator will generate an interrupt signal, which can be transmitted via the output interface. This interrupt is recognized, e.g., by the host connected to the output interface, as a signal that a new buffer's worth of information is ready to be drawn via the interface. Also, when a buffer is full, pointer within the bitstream generator is updated to point to a new, empty buffer.

Emulation Prevention

In some embodiments, in accordance with application-specific rules, emulation prevention is implemented. Some standards, such as the H.264 standard or the MPEG-2 standard, specifies certain patterns that are not to be transmitted as part of the data stream. Often, the standards also specify what action to take should one of these barred combinations be generated, e.g., adding a specific value as a marker. For example, in the H.264 standard, 22 zeros followed by any two bits should not be transmitted as part of the bitstream; if it is necessary to transmit such data, the standard specifies that a binary 3 should be added to the data stream. The corresponding decoder will detect the presence of the marker during the decoding process, and subtract it out again.

In order to prevent accidentally assembling one of these forbidden codes within the buffer, some embodiments of the present invention implement emulation prevention. Emulation prevention allows for monitoring the data within the buffer, watching for one of these defined forbidden combinations. Should such a combination be detected, and these embodiments performed the necessary action, as defined by the appropriate standard.

Bitstream Generator

Figure 18:
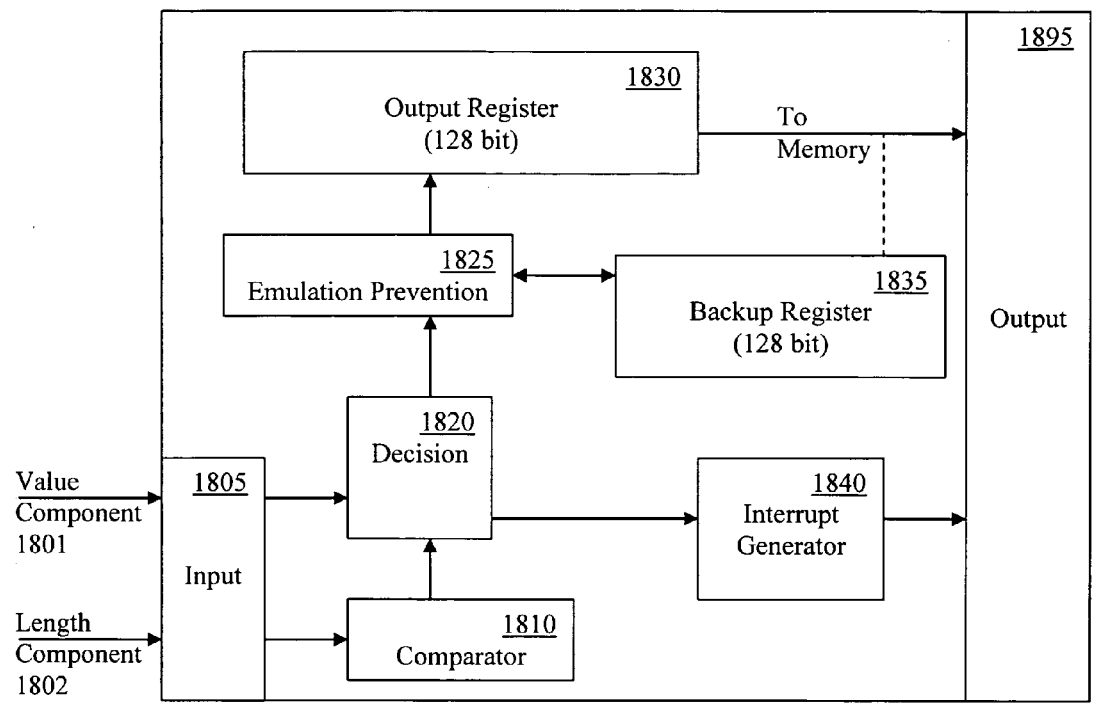
FIG. 18 depicts a block diagram of a bitstream generator, in accordance with one embodiment of the present invention.

With reference now to FIG. 18, a bitstream generator 1800 is depicted, in accordance with one embodiment of the present invention. While bitstream generator 1800 is shown as containing specific enumerated components, it is understood that these components are exemplary. In other embodiments, additional or fewer components are utilized; in several such embodiments, the functions of several components are combined into a single component, or the functions of the single component are differentiated amongst several components.

Bitstream generator 1800 is shown as receiving a value component 1801 and a length component 1802. In some embodiments, value component 1801 and length component 1802 are received via input interface 1805. In other embodiments, these two components may be received via separate interfaces (not shown). In the depicted embodiment, value component 1801 is passed directly to decision module 1820, while length component 1802 is passed to comparator 1810.

Bitstream generator 1800 is depicted as having a comparator 1810. In some embodiments, comparator 1810 checks the length of the current value component against space remaining in the current buffer. In some such embodiments, comparator 1810 includes available space counter 1811, which reflects the available space remaining in the current buffer.

Bitstream generator 1800 is shown as including decision module 1820. Decision module 1820 references the result generated by comparator 1810, and passes as many bits of the present value to the current output register as will fit. Any overflow bits, if present, are directed to a backup register. In some embodiments, decision module 1820 incorporates buffer pointer 1821. Buffer pointer 1821 is a pointer indicating which buffer is currently being used.

Bitstream generator 1800, in some embodiments, incorporates emulation prevention module 1825. Emulation prevention module 1825 monitors the combination of bits present in the output register or registers, and watches for certain combinations which are prohibited by the standard been implemented by bitstream generator 1800. If one of those combinations occurs, emulation prevention module 1825 alters the bits being placed into the output register, in accordance with the implemented standard.

Bitstream generator 1800 is depicted as incorporating two registers: output register 1830, and backup register 1835. In the depicted embodiment, output register 1830 and backup register 1835 are 128 bit registers. In other embodiments, differing number of registers may be utilized, or registers of different length and that depicted. Output register 1830 is used to store received to values until a full register's worth is ready to be sent, e.g., 128 bits of data are ready. Backup register 1835 is used to store overflow data, e.g., any bits of the current received value that do not fit in output register 1830. In some embodiments, the data stored in backup register 1835 is transferred to output register 1830, after the data from output register 1830 has been retrieved by a the connected host. In some other embodiments, the roles of these registers will reverse during the course of operation; for example, when output register 1830 is full, backup register 1835 is used to store all values received. Meanwhile, the data stored in output register 1830 can be drawn, and output register 1830 can be used to store overflow data, when backup register 1835 is full.

Bitstream generator 1800 is also shown as incorporating interrupt generator 1840. Interrupt generator 1840 generates an interrupt signal, which is passed to a connected host, indicating that output register 1830 is full, and the data can be drawn.

Bitstream generator 1800 includes output interface 1895. In some embodiments, external hosts or devices connect to bitstream generator 1800 through output interface 1895. In some embodiments, output interface 1895 and input interface 1805 can be incremented as a single component. In some embodiments, multiple output interfaces are utilized, to separate interrupt signals generated by interrupt generator 1840 from the data path used to draw or transmit data from output register 1830.

Method of Bitstream Generation

Figure 19:
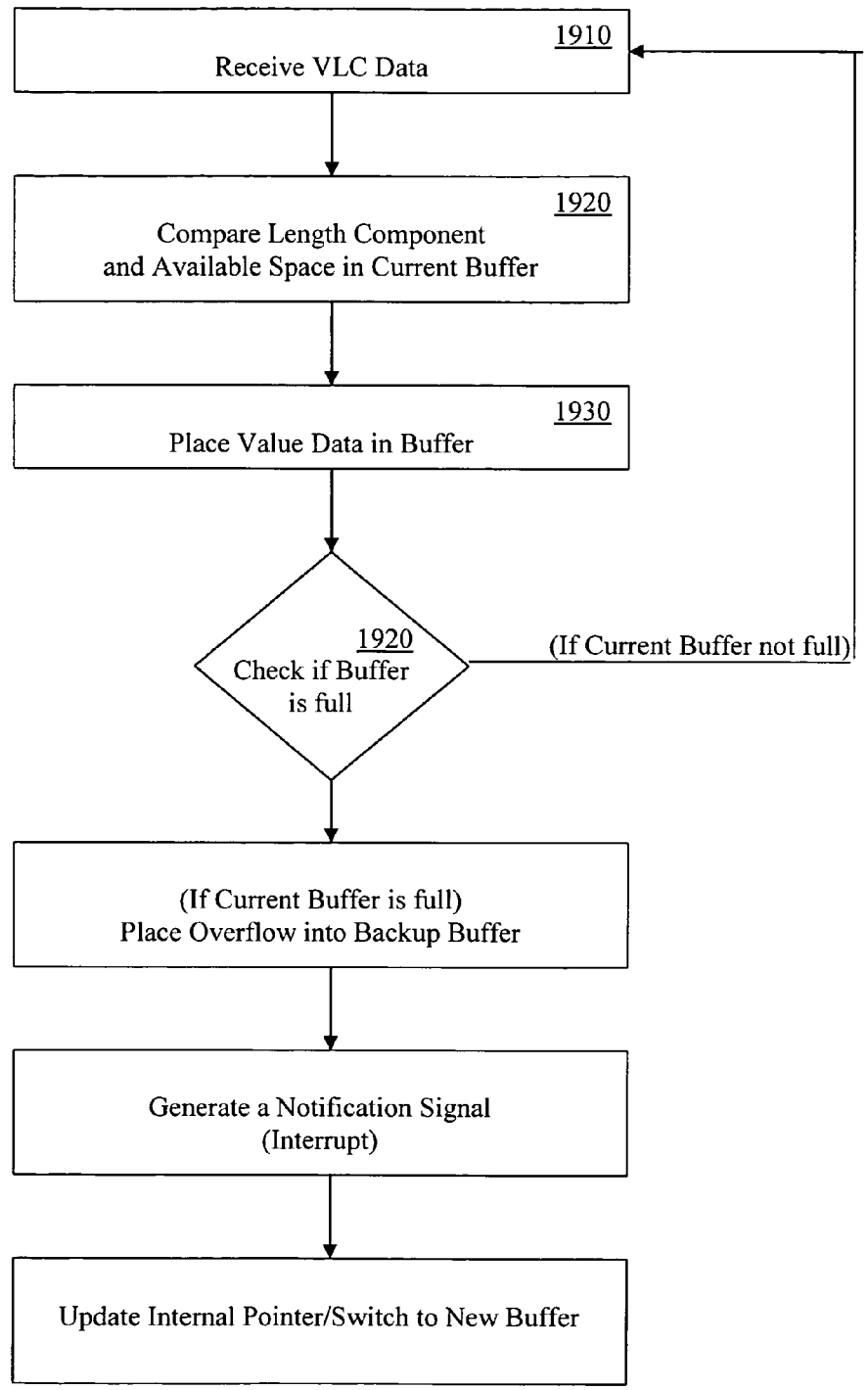
FIG. 19 depicts a flowchart of a computer implemented method of performing bitstream generation, in accordance with one embodiment of the present invention.

With reference now to FIG. 19, a flowchart 1900 of a method of performing Bitstream generation is depicted, in accordance with one embodiment of the present invention. Although specific steps are disclosed in flowchart 1900, such steps are exemplary. That is, embodiments of the present invention are well suited to performing various other (additional) steps or variations of the steps recited in flowchart 1900. It is appreciated that the steps in flowchart 1900 may be performed in an order different than presented, and that not all of the steps in flowchart 1900 may be performed.

With reference now to step 1910 and FIG. 18, a bitstream generator receives VLC data. For example, bitstream generator 1800 receives a value component 1801 and a corresponding length component 1802, via input interface 1805. In some embodiments, this data is transmitted to bitstream generator 1800, e.g., passed as operands to the CPU instruction initiating bitstream generation. In other embodiments, bitstream generator 1800 can draw data via input interface 1805, e.g., from connected state registers.

With reference now to step 1920 and FIG. 18, the bitstream generator compares the length component of the VLC data with the available space in the current buffer. For example, comparator 1810 compares length component 1802 with available space counter 1811.

With reference now to step 1930 and FIG. 18, the bitstream generator places the value data in an outgoing buffer. Value data is placed in the outgoing buffer until the outgoing buffer is full; any left over or overflow bits from the current value are placed into the next available buffer. For example, decision module 1820 references the result produced by comparator 1810. If comparator 1810 has determined that all of value component 1801 will fit in output register 1830, decision module 1820 passes all of value component 1801 to output register 1830. If comparator 1810 has determined that not all of value component 1801 will fit in output register 1830, decision module 1820 passes that portion of value component 1801 which will fit in output register 1830.

In some embodiments, the bitstream generator performs emulation prevention as part of the step. For example, emulation prevention module 1825 monitors the data being placed into output register 1830, or backup register 1835 as appropriate, watching for a combination of bits forbidden by the standard been implemented. If such a combination is detected, emulation prevention module 1825 performs the action specified by the standard.

With reference now to step 1940 and FIG. 18, if the current buffer of the bitstream generator is not full, operation of the bitstream generator returns to step 1910, and the bitstream generator receives or draws additional VLC data. If the current buffer of the bitstream generator is full, operation of the bitstream generator continues to step 1950. For example, if, after value component 1801 is written to output register 1830, output register 1830 is not full, bitstream generator 1800 can draw additional VLC data via input interface 1805.

With reference now to step 1950 and FIG. 18, any overflow data from the current value is written into a backup buffer. For example, if the value component 1801 is too long to fit in the remaining space of output register 1830, that portion of value component 1801 that does not fit is written to backup register 1835.

With reference now to step 1960 and FIG. 18, the bitstream generator generates a notification signal, or interrupt, indicating that a buffer has been filled. For example, when output register 1830 is full, interrupt generator 1840 generates an interrupt, which is passed over output interface 1895 to the connected host. The connected host, upon receipt of the interrupt signal, is notified that output register 1830 is full, and the data contained therein can be drawn as a 128 bit package.

With reference now to step 1970 and FIG. 18, the bitstream generator updates an internal pointer, and switches to a new data buffer. For example, decision module 1820 updates buffer pointer 1821 to point to backup register 1835, rather than output register 1830. New VLC data received will therefore be routed to backup register 1835, which has available space.

Applications

The processes described above have nearly as many potential applications as does the H-.264 standard. By providing a fast, reliable compression approach, with relatively modest power requirements, embodiments of the present invention are suitable for inclusion in both fixed and mobile applications. For example, the video processor described could be incorporated into many portable electronic devices, including digital camcorders, mobile or cellular telephones, webcams, personal digital assistants (PDAs), laptops, or any other device that incorporates a camera. Any device which captures digital video data can benefit from inclusion of various embodiments of the present invention, as the H.264 standard itself is flexible enough to be used in a wide variety of applications.

Embodiments of the present invention are thus described. While the present invention has been described in particular embodiments, it should be appreciated that the present invention should not be construed as limited by such embodiments, but rather construed according to the following claims.

The invention claimed is:

1. A video processor comprising:
an input for receiving a Direct-Current (DC) block, said DC block comprising a plurality of DC values;
an internal register for storing said plurality of DC values;
a multiplier, comprising a Hadamard transform matrix and configured to receive Single Instruction Multiple Data (SIMD) instructions, wherein upon receiving a first transform SIMD instruction, said multiplier operable to perform a 1-D Hadamard transform of said plurality of DC values using said Hadamard transform matrix, operable to produce a partially transformed plurality of DC values, and further operable to write said partially transformed plurality of DC values directly in a transposed manner to said internal register as transposed plurality of DC values to save processor cycles; and
wherein upon receiving a second transform SIMD instruction, said multiplier is operable to perform a 1-D Hadamard transform of said transposed plurality of DC values using said Hadamard transform matrix, producing a Hadamard transformed plurality of DC values, and is operable to write said Hadamard transformed plurality of DC values directly in a transposed manner to said internal register to save processor cycles.

2. The video processor of claim 1, wherein said internal register comprises a 16 element SIMD vector.

3. The video processor of claim 2, wherein said internal register comprises a 256 bit register.

4. The video processor of claim 1, wherein said multiplier comprises a plurality of bit shifters, a plurality of adders, and a plurality of sign changing gates.

5. The video processor of claim 4, wherein said transform matrix is implemented as a first subset of said plurality of bit shifters, a second subset of said plurality of adders, and a third subset of said plurality of sign changing gates.

6. The video processor of claim 1, wherein said video processor resides within a central processing unit (CPU).

7. The video processor of claim 1, wherein said video processor resides within an expansion card configured for use with a computing system.

8. A method comprising:
loading a plurality of pixel data corresponding to a block of image data into a single register;
in response to receiving a first Hadamard transform Single Instruction Multiple Data (SIMD) instruction from a software controller, processing said plurality of pixel data in a hardware processor, said processing comprising multiplying said plurality of pixel data by a hardware-implemented Hadamard transform matrix to produce a plurality of transformed pixel data and writing said plurality of transformed pixel data directly in a transposed form into said single register as a plurality of transposed intermediary data to save processor cycles; and
in response to receiving a second Hadamard transform Single Instruction Multiple Data (SIMD) instruction from a software controller, further processing said plurality of transposed intermediary data in said hardware processor by multiplying said plurality of transposed intermediary data by said Hadamard transform matrix to produce a result and writing the result directly in a transposed form into said single register as a plurality of Hadamard transformed data to save processor cycles.

9. The method of claim 8, further comprising writing said plurality of Hadamard transformed data to a memory of a computer system.

10. The method of claim 8, wherein said single register comprises a SIMD vector of 16 elements.

11. The method of claim 8, wherein said Hadamard transform operation is related to a version of the H.264 video compression standard.

12. The method of claim 8, wherein said hardware-implemented Hadamard transform matrix comprises a plurality of adders, bit shifters and sign-changing hardware connected by paths.

13. A computing system comprising:
a bus;
a processor coupled to said bus;
a memory coupled to said bus; and
a video processor coupled to said bus, said video processor comprising:
an input for receiving a block of image data, said image data comprising a plurality of pixel data;
an internal register for storing said plurality of pixel data;
a multiplier, comprising a transform matrix and configured to receive Single Instruction Multiple Data (SIMD) instructions from a software control structure, wherein upon receiving a Hadamard transform SIMD instruction, said multiplier is operable to perform a 1-D transform of said plurality of pixel data utilizing said transform matrix, producing a partially transformed plurality of pixel data, is operable to write said partially transformed plurality of pixel data directly in a transposed manner to said internal register as transposed plurality of pixel data to save processor cycles, is operable to perform a 1-D transform of said transposed plurality of pixel data utilizing said transform matrix, producing a Hadamard transformed plurality of pixel data and is operable to write said Hadamard transformed plurality of pixel data directly in a transposed manner to said internal register to save processor cycles.

14. The computing system of claim 13, wherein said transform matrix comprises a Hadamard transform matrix associated with the H.264 video compression standard.

15. The computing system of claim 14, further comprising:
a camera assembly, coupled to said bus; and
a digital data storage, coupled to said bus, wherein said camera assembly and digital data storage are configured to record digital video data.

16. The computing system of claim 15, wherein said computing system resides within a mobile telephone.

17. The computing system of claim 15, wherein said computing system resides within a digital camcorder.

18. The computing system of claim 15, wherein said computing system resides within a webcam.

19. The video processor of claim 1, wherein said partially transformed plurality of DC values are transposed via writing said partially transformed plurality of DC values into said internal register.

20. The video processor of claim 1, wherein said first transform SIMD instruction is operable for a forward Hadamard transform and an inverse Hadamard transform.

* * * * *